(12) United States Patent
Tsuchiya et al.

(10) Patent No.: US 10,598,250 B2
(45) Date of Patent: Mar. 24, 2020

(54) TORQUE CONTROL MECHANISM, DAMPER DEVICE PHASE ADJUSTMENT MECHANISM, AND TORQUE CONTROL MECHANISM AND TORQUE VARIATION SUPPRESSING APPARATUS USING THE SAME

(71) Applicant: KABUSHIKI KAISHA TOYOTA CHUO KENKYUSHO, Nagakute-shi, Aichi-ken (JP)

(72) Inventors: Eiji Tsuchiya, Nagakute (JP); Yoshihiro Mizuno, Nagakute (JP); Norio Yonezawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/882,170

(22) Filed: Jan. 29, 2018

(65) Prior Publication Data

US 2018/0231096 A1     Aug. 16, 2018

(30) Foreign Application Priority Data

Feb. 13, 2017  (JP) ................................ 2017-023881
Feb. 13, 2017  (JP) ................................ 2017-023882
Jun. 13, 2017  (JP) ................................ 2017-116135

(51) Int. Cl.
*F16F 15/04*     (2006.01)
*F16F 15/03*     (2006.01)

(52) U.S. Cl.
CPC ............ *F16F 15/043* (2013.01); *F16F 15/03* (2013.01); *F16F 2222/06* (2013.01); *F16F 2230/0064* (2013.01); *F16F 2232/02* (2013.01)

(58) Field of Classification Search
CPC ........ F16F 15/04; F16F 15/043; F16F 15/063; F16F 15/06; F16F 15/26; F16F 15/261; F16F 15/24; F02B 75/06
See application file for complete search history.

(56) References Cited

U.S. PATENT DOCUMENTS

| | | | |
|---|---|---|---|
| 4,854,274 A * | 8/1989 | Dingess | F02B 75/06 123/192.1 |
| 2012/0067317 A1 | 3/2012 | Towne | |
| 2017/0009860 A1 | 1/2017 | Tsuchiya et al. | |

FOREIGN PATENT DOCUMENTS

| | | | | |
|---|---|---|---|---|
| DE | 2333038 A1 * | 1/1975 | ............ | F16F 15/261 |
| DE | 4038803 A1 * | 6/1991 | .............. | F02B 75/06 |

(Continued)

OTHER PUBLICATIONS

U.S. Appl. No. 15/695,581, filed on Sep. 5, 2017 in the name of Eiji Tsuchiya et al.

(Continued)

*Primary Examiner* — Thomas C Diaz
(74) *Attorney, Agent, or Firm* — Oliff PLC

(57) ABSTRACT

A torque variation suppressing apparatus includes a rotation element, and a plurality of first elastic elements and second elastic elements which apply elastic forces to the rotation element. With a rotation of the rotation element, a torque applied to the rotation element from each of the first elastic elements and the second elastic elements changes periodically, and a phase of the torque applied to the rotation element from at least one of the first elastic elements and the second elastic elements is changed so that an overall torque characteristic applied to the rotation element is set variable.

3 Claims, 36 Drawing Sheets

(56) References Cited

FOREIGN PATENT DOCUMENTS

| | | |
|---|---|---|
| JP | S61-66820 A | 4/1986 |
| JP | H03-140653 A | 6/1991 |
| JP | H06-042314 A | 2/1994 |
| JP | H07-332026 A | 12/1995 |
| JP | 2011-208774 A | 10/2011 |
| JP | 3180044 U | 11/2012 |
| JP | 2015-135179 A | 7/2015 |
| JP | 2016-80003 A | 5/2016 |

OTHER PUBLICATIONS

Oct. 1, 2019 Office Action issued in Japanese Patent Application No. 2017-116135.

* cited by examiner

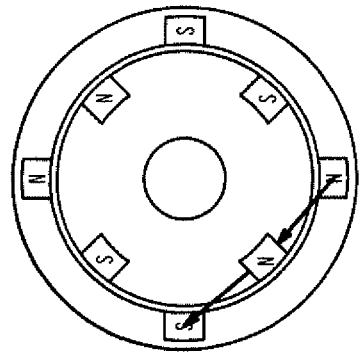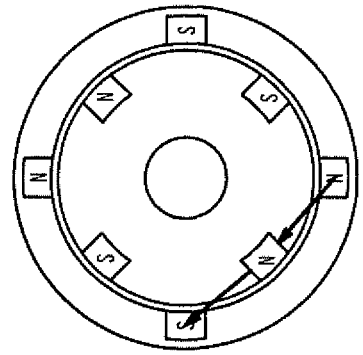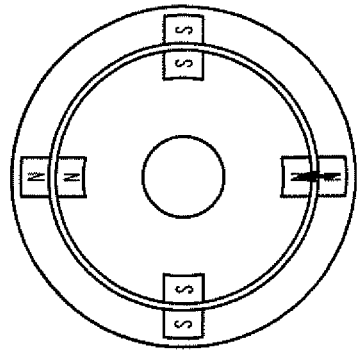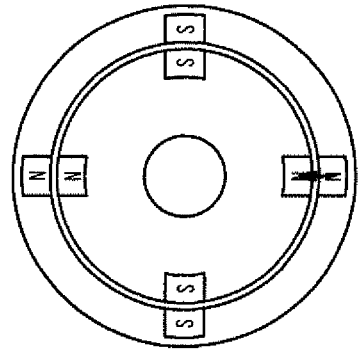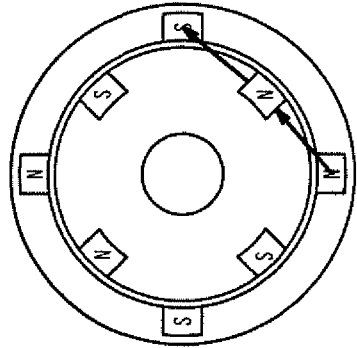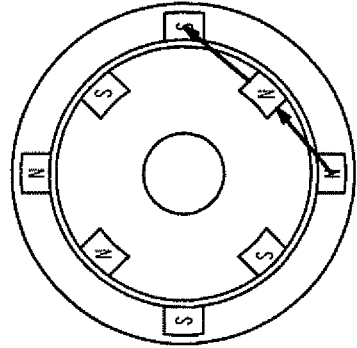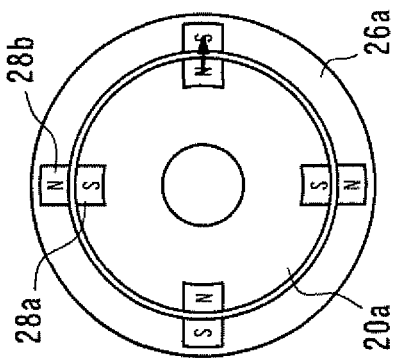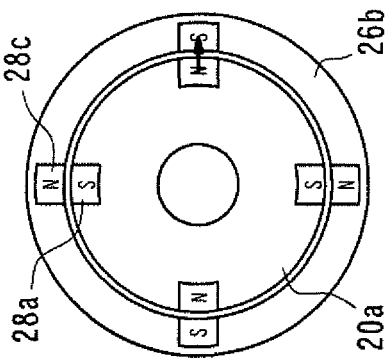
FIG. 10A    FIG. 10B

400

TORQUE CONTROL MECHANISM, DAMPER DEVICE PHASE ADJUSTMENT MECHANISM, AND TORQUE CONTROL MECHANISM AND TORQUE VARIATION SUPPRESSING APPARATUS USING THE SAME

CROSS REFERENCE TO RELATED APPLICATION

The disclosures of Japanese Patent Application No. 2017-023881 filed on Feb. 13, 2017, Japanese Patent Application No. 2017-023882 filed on Feb. 13, 2017, and Japanese Patent Application No. 2017-116135 filed on Jun. 13, 2017, including the specifications, claims, drawings, and abstracts, are incorporated herein by reference in their entirety.

TECHNICAL FIELD

The present disclosure relates to a torque control mechanism, a damper device phase adjustment mechanism, and a torque control mechanism and a torque variation suppressing apparatus which use these mechanisms.

BACKGROUND

In a vehicle or the like, when power and a rotation rate become large, a torsional vibration and a bending vibration with respect to a crank shaft are increased. Because of this, there is employed a technique in which a rubber damper or the like is provided at a shaft end of the crank shaft, to suppress the torsional vibration and the bending vibration.

For example, JP H3-140653 A discloses a variable spring constant-type rotation shaft vibration dumper in which a circular ring shaped inertial body is placed on an outer circumferential portion of a damper disc with rubber therebetween, and which comprises a spring end fixation unit that simultaneously connects a spring to the inertial body and the damper disc at a set rotation rate.

JP 2015-135179 A discloses a drive force transmission apparatus comprising a first rotation shaft, a second rotation shaft, an elastic member, and a vibration element, wherein one end of the elastic member is fixed at a position deviated from an axial center of the second rotation shaft, the other end of the elastic member is fixed on the vibration element, and the vibration element can take either a state where the vibration element is connected to the first rotation shaft or a state where the vibration element is not connected to the first rotation shaft.

In addition, in the related art, a device for suppressing a torque variation of an internal combustion engine or the like is known, such as a vibration damper described in JP 2011-208774 A.

In the variable spring constant-type damper of the related art, the entire rigidity of a torsional damper is changed by a fixation position or an applied pressure of the spring itself. Therefore, a range where the rigidity can be varied is limited, and there have been problems in that the structure becomes complicated and the timing for making the rigidity variable is restricted. In addition, in order to limit the torque when a large force is applied to the spring, a frictional member must be provided in series with the spring.

In addition, in the drive force transmission device of the related art, because a structure for releasing the drive force is necessary, there is a problem in that the size of the device becomes large. Moreover, in a typical damper, the rigidity is not variable. Further, in the variable spring constant-type damper, a range where the rigidity can be varied is limited, and there have been problems in that the structure becomes complicated, and the timing for making the rigidity variable is restricted. In addition, in order to limit the torque when a large force is applied to the spring, a torque limiter such as a frictional member must be provided in series with the spring.

Further, in the torque variation suppressing apparatus of the related art, the elastic element and a mass (massive portion) for suppressing the torque variation are provided on a rotation transmission system, thereby increasing the overall weight of the rotation transmission system.

SUMMARY

According to one aspect of the present disclosure, there is provided a torque control mechanism comprising: a rotation element; and a plurality of elastic structures that apply elastic forces to the rotation element, wherein a torque applied to the rotation element from each of the elastic structures changes periodically with a rotation of the rotation element, and a phase of a torque applied to the rotation element from at least one of the elastic structures is changed so that an overall torque characteristic applied to the rotation element is set variable.

Desirably, the phase of the torque applied to the rotation element from at least one of the elastic structures is changed so that torques applied to the rotation element from the remaining ones of the elastic structures are cancelled, and an overall torque applied to the rotation element can be set to zero.

Desirably, the rotation element comprises a crank shaft, and the elastic structure is an elastic element connected to the crank shaft.

Desirably, the rotation element comprises a magnet, and the elastic structure comprises a magnet which generates a magnetic force between the magnet and the magnet provided on the rotation element.

Desirably, the rotation element comprises a cam, and the elastic structure comprises an elastic element which applies, to the cam, an elastic force which changes according to a rotational angle of a rotation shaft of the cam.

According to another aspect of the present disclosure, there is provided a damper apparatus comprising the above-described torque control mechanism, wherein, when a damping characteristic with respect to the rotation element is to be increased, an overall torque applied to the rotation element is reduced, and, when a torque which is output from the rotation element is to be increased, an overall torque applied to the rotation element is increased.

According to another aspect of the present disclosure, there is provided a phase adjustment mechanism comprising: a rotation element; an elastic structure that applies, to the rotation element, a torque which changes periodically with a rotation of the rotation element; a retainer that retains the elastic structure with a retaining torque which is greater than or equal to a maximum torque applied to the rotation element from the elastic structure; and a driver unit that applies a drive torque which is greater than a difference between the retaining torque and the maximum torque, to move the elastic structure relative to the retainer, and to consequently set a phase of the torque applied to the rotation element from the elastic structure variable.

Desirably, the drive torque applied by the driver unit is smaller than the maximum torque.

Desirably, the driver unit applies the drive torque only during a predetermined period including a timing when the maximum torque is applied to the rotation element from the elastic structure.

According to another aspect of the present disclosure, there is provided a phase adjustment mechanism comprising: a rotation element; an elastic structure that applies, to the rotation element, a torque which changes periodically with a rotation of the rotation element; a retainer that retains the elastic structure with a retaining torque which is greater than or equal to a maximum torque applied to the rotation element from the elastic structure; and a driver unit that reduces the retaining torque to a torque smaller than the maximum torque, to move the elastic structure relative to the retainer, and to consequently set a phase of the torque applied to the rotation element from the elastic structure variable.

Desirably, the driver unit comprises a structure which can select a movement direction of the elastic structure.

Desirably, the driver unit reduces the retaining torque only during a predetermined period including a timing when the maximum torque is applied to the rotation element from the elastic structure.

According to another aspect of the present disclosure, there is provided a torque control mechanism comprising: the above-described phase adjustment mechanism; and a plurality of the elastic structures, wherein the phase adjustment mechanism changes a phase of a torque applied to the rotation element from at least one of the elastic structures, so that an overall torque characteristic applied to the rotation element is set variable.

According to another aspect of the present disclosure, there is provided a torque variation suppressing apparatus, comprising a rotation unit, an outer circumferential portion, and an urging unit. The rotation unit is provided on a shaft to which a torque is transmitted from a rotational drive source. The outer circumferential portion is provided concentrically with the rotation unit with an axial center of the shaft as a reference, and is provided separated from the shaft and the rotation unit. The urging unit is provided on the rotation unit and the outer circumferential portion. Further, in the urging unit, an urging force to the shaft is switched between a force in the same direction as a rotation of the shaft and a force in the opposite direction from the rotation of the shaft, according to a relative rotational position of the rotation unit and the outer circumferential portion.

According to another aspect of the present disclosure, in the above-described structure, the urging unit may comprise a plurality of magnets provided around a circumference on an outer circumferential surface of the rotation unit, and a plurality of magnets provided around a circumference on an inner circumferential surface of the outer circumferential portion, separated in a radial direction from the plurality of magnets of the rotation unit. In this case, the urging force to the shaft may be switched between the force in the same direction as the rotation of the shaft and the force in the opposite direction from the rotation of the shaft by an attraction distribution and a repulsion distribution of the magnets of the rotation unit and the outer circumferential portion being changed according to the relative rotational position of the rotation unit and the outer circumferential portion.

According to another aspect of the present disclosure, in the above-described structure, a first pair and a second pair may be provided, each including the rotation unit and the outer circumferential portion, along a direction of extension of the shaft. In this case, an angle adjustment mechanism may be provided on the outer circumferential portion of one of the first pair and the second pair, which can change a relative angular position with respect to the outer circumferential portion of the other of the first pair and the second pair.

According to another aspect of the present disclosure, the outer circumferential portion of the other of the first pair and the second pair may be fixed on a fixation unit.

According to another aspect of the present disclosure, the angle adjustment mechanism may be provided also on the outer circumferential portion of the other of the first pair and the second pair.

According to another aspect of the present disclosure, the structure may further comprise a rotation mechanism which can rotate the outer circumferential portion around the shaft.

According to another aspect of the present disclosure, the rotation unit may comprise a cam which rotates with the shaft. In this case, the outer circumferential portion may comprise a contact member which contacts the cam and an elastic element which urges the contact member toward an inner side in a radial direction.

According to one aspect of the present disclosure, a peak torque and a torque characteristic with respect to the rotation element can be controlled without the use of a complicated method.

According to one aspect of the present disclosure, there can be provided a phase adjustment mechanism which enables phase adjustment without the need of a large drive force in a phase control of a periodic inversion spring structure, and a torque control mechanism which uses the phase adjustment mechanism.

According to another aspect of the present disclosure, a part of the torque variation suppressing apparatus is separated from the rotation system. As a result, a weight load to the rotation transmission system can be reduced.

BRIEF DESCRIPTION OF DRAWINGS

Embodiment(s) of the present disclosure will be described by reference to the following figures, wherein:

FIGS. 10A~10C are diagrams showing a torque applied to a rotation element from a torque control mechanism according to a first alternative configuration of the present disclosure;

DESCRIPTION OF EMBODIMENTS

Basic Structure

Figure 1A:
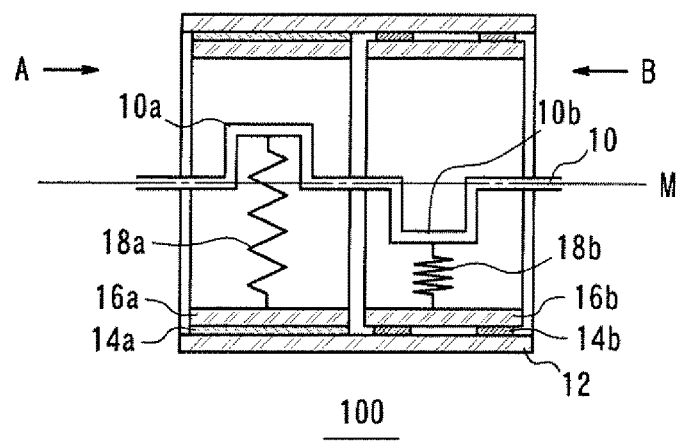
FIGS. 1A~1C are diagrams showing a structure of a torque control mechanism according to an embodiment of the present disclosure.
Figure 1B:
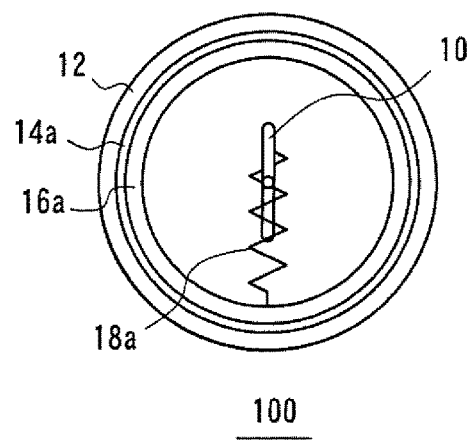
Figure 1C:
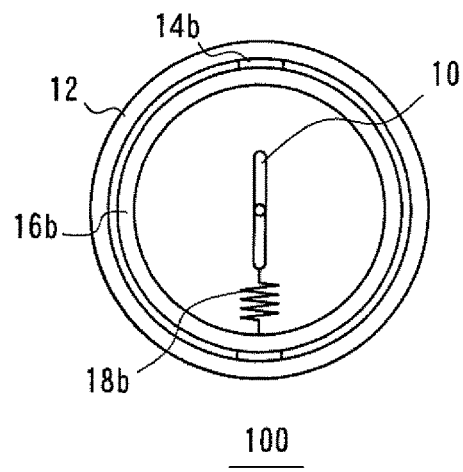

As shown in FIGS. 1A~1C, a torque control mechanism 100 according to an embodiment of the present disclosure comprises a rotation element 10, a casing 12, a retainer 14 (a first retainer 14a and a second retainer 14b), an elastic element retainer 16 (a first elastic element retainer 16a and a second elastic element retainer 16b), and an elastic element 18 (a first elastic element 18a and a second elastic element 18b). The torque control mechanism 100 is a mechanism which applies a torque to the rotation element 10 with a rotation of the rotation element 10.

FIG. 1A is a cross-sectional side view of the torque control mechanism 100. FIG. 1B is a front view of the torque control mechanism 100, viewed from a direction A. FIG. 1C is a back view of the torque control mechanism 100, viewed from a direction B. In order to prevent complication of the drawings, in FIG. 1B, the second elastic element 18b is omitted, and in FIG. 1C, the first elastic element 18a is omitted.

The rotation element 10 is a rotation element which rotates with a rotational axis M as a center of the rotation. As shown in FIG. 1A, the rotation element 10 comprises a crank mechanism including a crank unit 10a which connects to a shaft deviated from the rotational axis M, and a crank unit 10b connecting to a shaft which is deviated from this shaft (of the crank unit 10a) by 180°. The rotation element 10 may be formed from a metal or the like having mechanical strength.

The casing 12 is a circular tubular member having a center at the rotational axis M, and which stores therein the rotation element 10, the retainer 14, the elastic element retainer 16, and the elastic element 18. The casing 12 may be formed from a metal or the like having mechanical strength.

The elastic element retainer 16 is a member comprising the first elastic element retainer 16a and the second elastic element retainer 16b, and to which one end of the elastic element 18 is fixed. Each of the first elastic element retainer 16a and the second elastic element retainer 16b may be a circular tubular member having a center at the rotational axis M, and which has an outer size which is smaller than an inner size of the casing 12. On an inner surface of the first elastic element retainer 16a, one end of the first elastic element 18a is fixed. On an inner surface of the second elastic element retainer 16b, one end of the second elastic element 18b is fixed. The first elastic element retainer 16a and the second elastic element retainer 16b are aligned and placed along the rotational axis M. The first elastic element retainer 16a and the second elastic element retainer 16b may be formed from a metal or the like having mechanical strength.

The retainer 14 comprises the first retainer 14a and the second retainer 14b. The first retainer 14a is a member which retains the first elastic element retainer 16a in a manner to not allow rotation thereof with respect to the casing 12. The second retainer 14b is a member which retains the second elastic element retainer 16b in a manner to not allow rotation thereof with respect to the casing 12. Here, the first retainer 14a and the second retainer 14b are units which retain the first elastic element retainer 16a and the second elastic element retainer 16b on the casing 12 in a manner to allow relative rotation around the rotational axis M. For example, the first retainer 14a may be an adhesive or the like which completely fixes the first elastic element retainer 16a on the casing 12, and the second retainer 14b may be a latch mechanism or the like which can allow relative rotation of and can fix the second elastic element retainer 16b with respect to the casing 12.

The elastic element 18 comprises the first elastic element 18a and the second elastic element 18b. The first elastic element 18a and the second elastic element 18b are members which generate elastic forces, and may be, for example, a spring, a rubber, or the like, although the elements are not limited to these. One end of the first elastic element 18a is fixed to the inner surface of the first elastic element retainer 16a, and the other end is fixed to the crank unit 10a of the rotation element 10. One end of the second elastic element 18b is fixed to the inner surface of the second elastic element retainer 16b, and the other end is fixed to the crank unit 10b of the rotation element 10.

In the present embodiment, the first elastic element 18a and the second elastic element 18b are elements having the same elastic characteristics. The present disclosure, however, is not limited to such a configuration, and the elastic characteristics of the first elastic element 18a and the second elastic element 18b may be suitably set according to the torque characteristic to be applied to the rotation element 10 from the torque control mechanism 100.

As described, the torque control mechanism 100 of the present embodiment comprises an elastic structure formed from a pair of the first elastic element retainer 16a and the first elastic element 18a, and an elastic structure formed from a pair of the second elastic element retainer 16b and the second elastic element 18b. In other words, the torque control mechanism 100 comprises two pairs of the elastic structures for applying elastic forces to the rotation element 10.

Figure 2A:
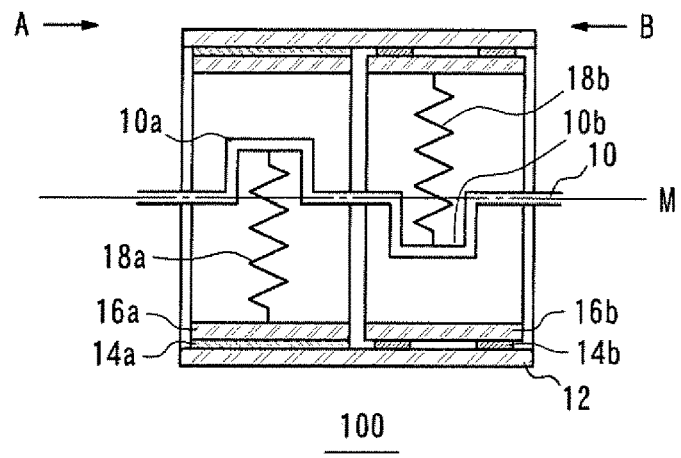
FIGS. 2A~2C are diagrams showing a structure of a torque control mechanism according to an embodiment of the present disclosure.
Figure 2B:
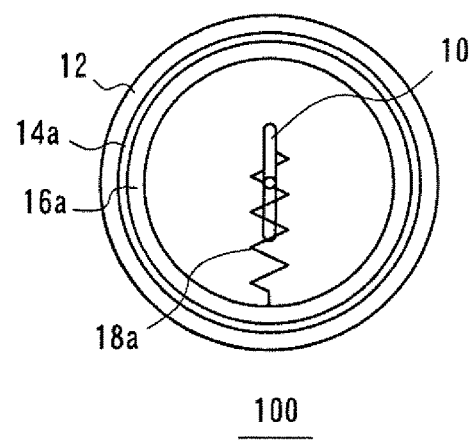
Figure 2C:
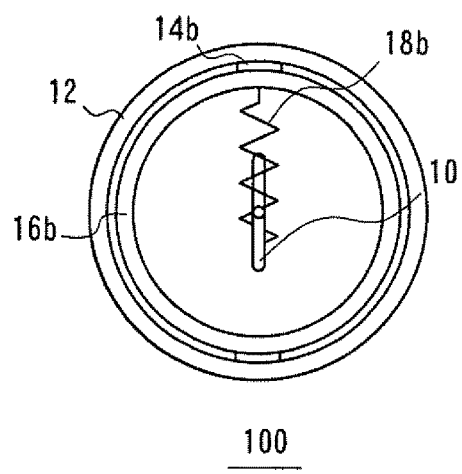

In the torque control mechanism 100, the second elastic element retainer 16b may be set to a rotatable state with respect to the casing 12 by the second retainer 14b, and the second elastic element retainer 16b may be rotated with respect to the casing 12. When the second retainer 14b is a latch mechanism, the second elastic element retainer 16b may be set to the rotatable state with respect to the casing 12 by releasing the latch. For example, as shown in FIGS. 2A~2C, a state may be achieved in which the second elastic element retainer 16b is rotated by 180° from the state of FIG. 1.

Figure 3:
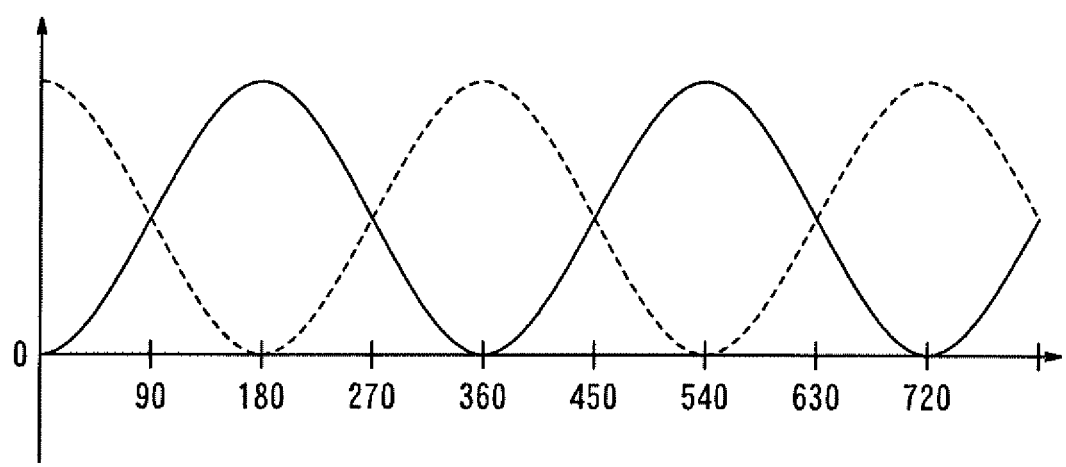
FIG. 3 is a diagram showing an elastic force applied to a rotation element from a torque control mechanism according to an embodiment of the present disclosure.

In the state of FIG. 1, as shown by a solid line in FIG. 3, an elastic force is periodically applied to the rotation element 10 from the first elastic element 18a. In addition, as shown by a broken line in FIG. 3, an elastic force is periodically applied to the rotation element 10 from the second elastic element 18b. The elastic force applied to the rotation element 10 from the first elastic element 18a and the elastic force applied to the rotation element 10 from the second elastic element 18b are set in a state where phases thereof are shifted by 180° (a half period).

Figure 4:
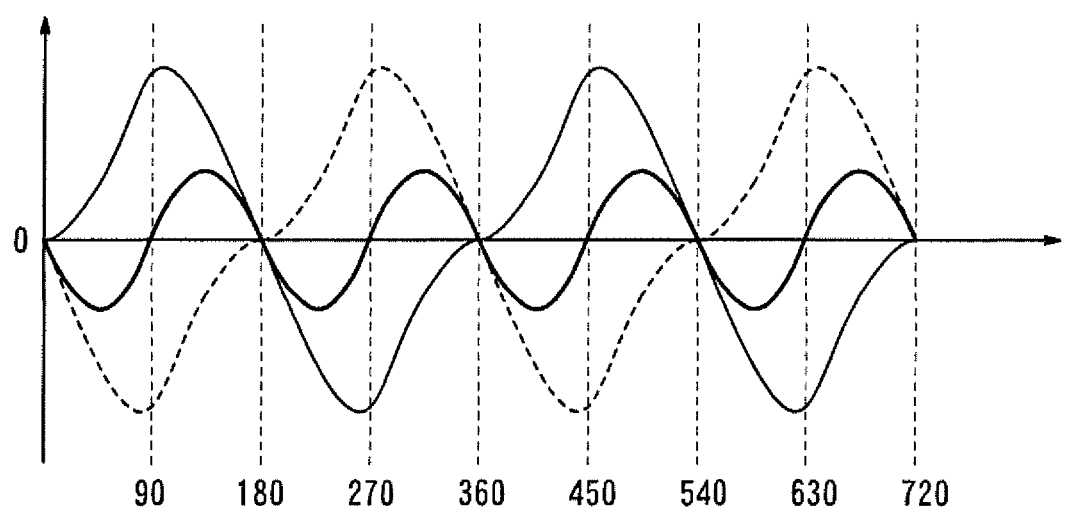
FIG. 4 is a diagram showing a torque applied to a rotation element from a torque control mechanism according to an embodiment of the present disclosure.

When the rotation element 10 rotates, as shown in FIG. 4, torques are applied respectively from the first elastic element 18a and the second elastic element 18b to the rotation element 10. In FIG. 4, the torque applied from the first elastic element 18a to the rotation element 10 is shown by a thin solid line, and the torque applied from the second elastic element 18b to the rotation element 10 is shown with a thin broken line. Therefore, a combined torque applied from the first elastic element 18a and the second elastic element 18b to the rotation element 10 is a torque shown by a thick solid line.

Figure 5:
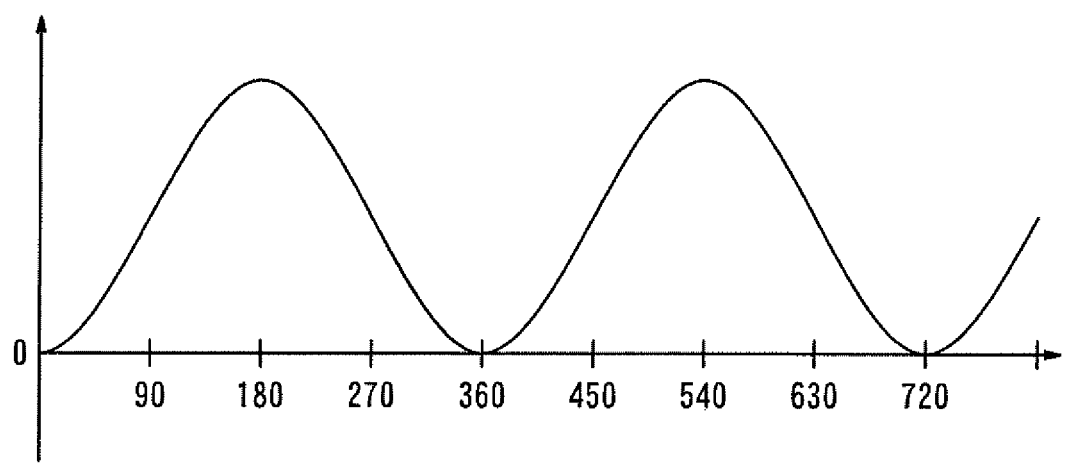
FIG. 5 is a diagram showing an elastic force applied to a rotation element from a torque control mechanism according to an embodiment of the present disclosure.

On the other hand, in the state of FIG. 2, as shown in FIG. 5, the elastic force applied to the rotation element 10 from the first elastic element 18a and the elastic force applied to the rotation element 10 from the second elastic element 18b are matched in phase.

Figure 6:
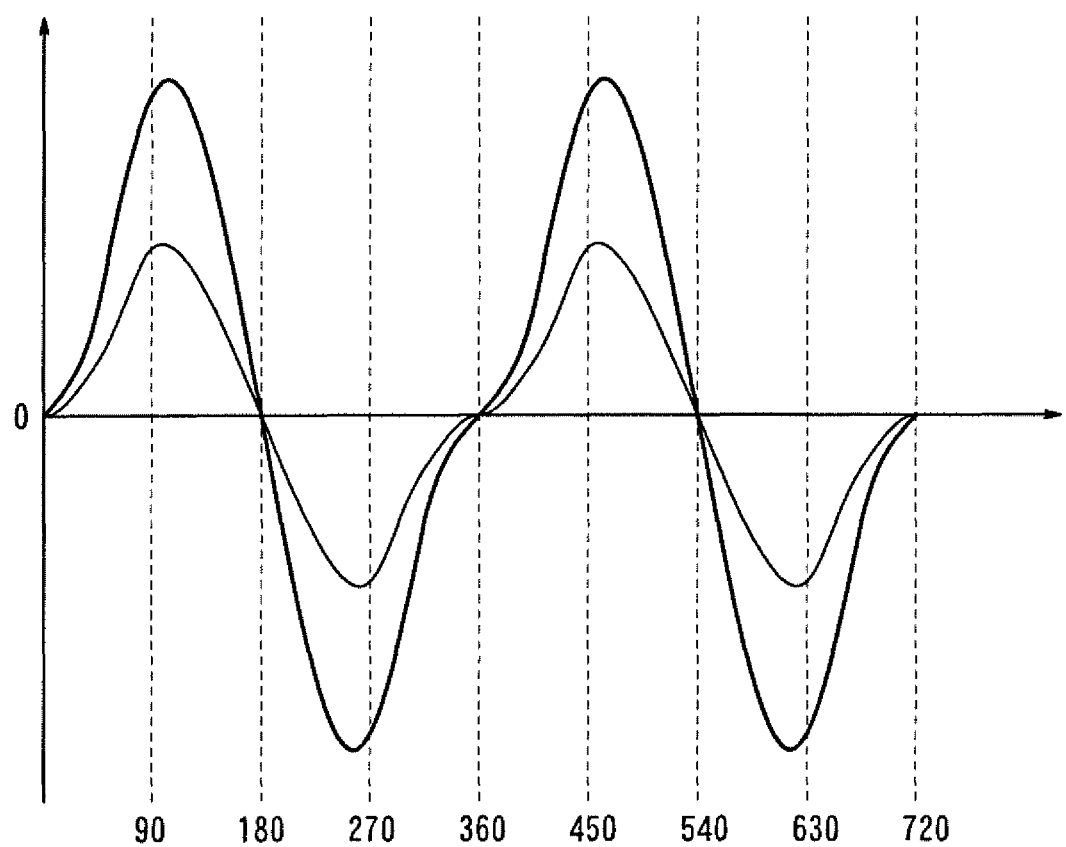
FIG. 6 is a diagram showing a torque applied to a rotation element from a torque control mechanism according to an embodiment of the present disclosure.

When the rotation element 10 rotates, as shown in FIG. 6, torques are applied to the rotation element 10 respectively from the first elastic element 18a and the second elastic element 18b. In FIG. 6, the torques applied to the rotation element 10 from the first elastic element 18a and the second elastic element 18b are shown by thin solid lines. Therefore, a combined torque applied to the rotation element 10 from the first elastic element 18a and the second elastic element 18b is a torque as shown by a thick solid line.

As described, in the torque control mechanism 100 of the present embodiment, the phase of the torque applied to the rotation element 10 from the elastic structure formed from the second elastic element retainer 16b and the second elastic element 18b is changed so that the combined torque applied to the rotation element 10 can be set variable.

In other words, by providing a plurality of elastic structures having the torque inverted in the positive and negative with respect to the rotation of the rotation element 10, and setting the phase of the torque applied to the rotation element 10 from at least one of the elastic structures variable, it becomes possible to control the peak torque and the torque characteristic with respect to the rotation element 10 without the use of a complicated method.

First Alternative Configuration

Figure 7:
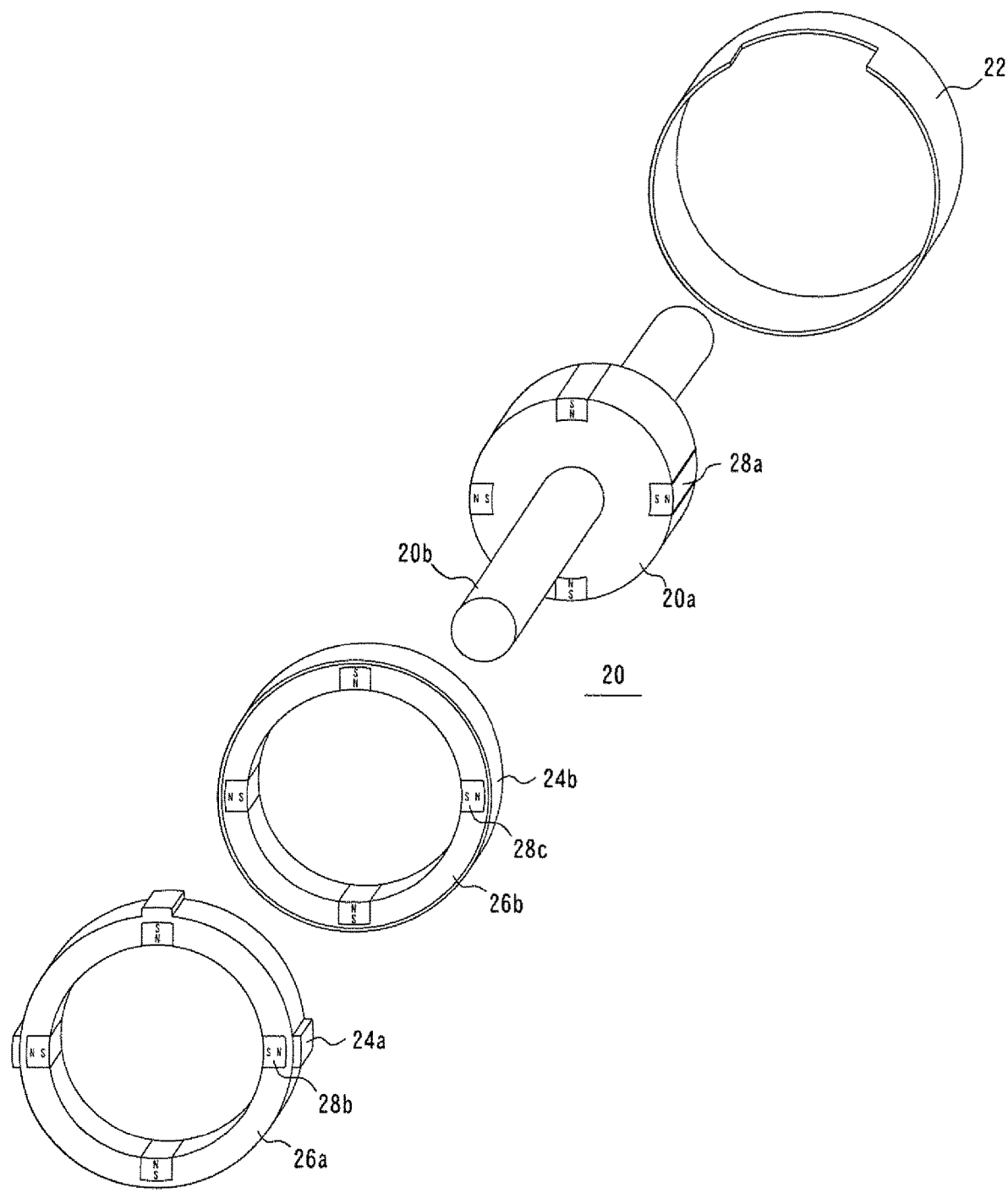
FIG. 7 is an exploded diagram showing a structure of a torque control mechanism according to a first alternative configuration of the present disclosure.
Figure 8:
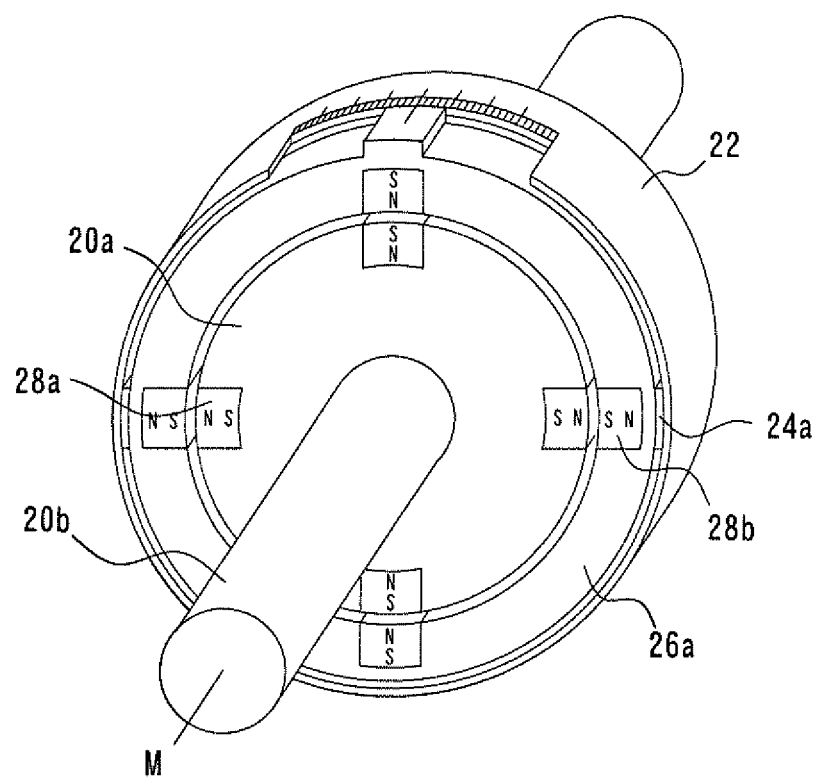
FIG. 8 is a diagram showing a structure of a torque control mechanism according to a first alternative configuration of the present disclosure.

In the above-described embodiment, a structure is employed in which the elastic structure including the first elastic element retainer 16a and the first elastic element 18a, and the elastic structure including the second elastic element retainer 16b and the second elastic element 18b are combined, but the present disclosure is not limited to such a configuration. A torque control mechanism 200 according to a first alternative configuration comprises, as shown in FIGS. 7 and 8, a rotation element 20, a casing 22, a retainer 24 (a first retainer 24a and a second retainer 24b), an elastic element retainer 26 (a first elastic element retainer 26a and a second elastic element retainer 26b), and a magnet 28 (a first magnet 28a, a second magnet 28b, and a third magnet 28c). FIG. 7 is an exploded view of the torque control mechanism 200, and FIG. 8 is an outer perspective view of the torque control mechanism 200.

The rotation element 20 is a rotation element which rotates with the rotational axis M as a center of the rotation. The rotation element 20 comprises a rotor 20a having a circular column shape, and a shaft 20b fixed penetrating through the center of the rotor 20a. The rotor 20a and the shaft 20b are desirably formed from a material having mechanical strength, in particular, from a magnetic material. On an outer circumferential portion of the rotor 20a, the first magnet 28a is placed. The first magnet 28a is placed at a periphery of the rotor 20a in an equal spacing, in such a manner that polarities are alternately switched in a radial direction of the rotor 20a. In the present embodiment, an example configuration is shown in which four first magnets 28a are placed in such a manner that the polarities are alternately switched every 90°.

The casing 22 is a circular tubular member having a center at the rotational axis M, and which stores therein the rotation element 20, the retainer 24, the elastic element retainer 26, and the magnet 28. The casing 22 is an approximate circular tubular shaped member having a larger inner size than an outer size of the elastic element retainer 26. The casing 22 may be formed from a metal or the like having mechanical strength.

The elastic element retainer 26 comprises the first elastic element retainer 26a and the second elastic element retainer 26b. The first elastic element retainer 26a and the second elastic element retainer 26b are members onto which the second magnet 28b and the third magnet 28c are fixed respectively. The first elastic element retainer 26a and the second elastic element retainer 26b are circular tubular members having a center at the rotational axis M and having an outer size smaller than an inner size of the casing 22 and an inner size larger than an outer size of the rotor 20a. The first elastic element retainer 26a and the second elastic element retainer 26b are placed in the casing 22, aligned along the rotational axis M. The first elastic element retainer 26a and the second elastic element retainer 26b are desirably formed from a material having mechanical strength, in particular, a magnetic material.

On an inner circumferential surface of the first elastic element retainer 26a, the second magnet 28b is placed. The second magnet 28b is placed at a periphery of the first elastic element retainer 26a at an equal spacing, in such a manner that the polarities are alternately switched in a radial direction of the first elastic element retainer 26a. In the present embodiment, an example configuration is shown in which four second magnets 28b are placed in such a manner that the polarities are alternately switched every 90°. On an inner circumferential surface of the second elastic element retainer 26b, the third magnet 28c is placed. The third magnet 28c is placed at a periphery of the second elastic element retainer 26b at an equal spacing in such a manner that the polarities are alternately switched in a radial direction of the second elastic element retainer 26b. In the present embodiment, an example configuration is shown in which four third magnets 28c are placed in such a manner that the polarities are alternately switched every 90°.

The retainer 24 comprises the first retainer 24a and the second retainer 24b. The first retainer 24a is a member which retains the first elastic element retainer 26a to not allow rotation thereof with respect to the casing 22. The second retainer 24b is a member which retains the second elastic element retainer 26b to not allow rotation thereof with respect to the casing 22. Here, the first retainer 24a and the second retainer 24b are units which retain the first elastic element retainer 26a and the second elastic element retainer 26b on the casing 22 in a manner to allow relative rotation around the rotational axis M. For example, the second retainer 24b may be an adhesive or the like which completely fixes the second elastic element retainer 26b to the casing 22, and the first retainer 24a may be a latch mechanism or the like which can allow relative rotation of and can fix the first elastic element retainer 26a with respect to the casing 22.

In the present embodiment, the second magnet 28b and the third magnet 28c have the same magnetic force. The present disclosure, however, is not limited to such a configuration, and the magnetic forces of the second magnet 28b and the third magnet 28c may be suitably set according to the torque characteristic to be applied to the rotation element 20 from the torque control mechanism 200.

As described, the torque control mechanism 200 according to the present embodiment comprises an elastic structure formed from a pair of the first magnet 28a placed at the outer circumference of the rotation element 20 and the second magnet 28b placed at the inner circumference of the first elastic element retainer 26a, and an elastic structure formed from a pair of the first magnet 28a placed at the outer circumference of the rotation element 20 and the third magnet 28c placed at the inner circumference of the second elastic element retainer 26b. In other words, the torque control mechanism 200 comprises two pairs of elastic structures which apply elastic forces to the rotation element 20 when the rotation element 20 rotates.

In the torque control mechanism 200, with the first retainer 24a, the first elastic element retainer 26a is set in a rotatable state with respect to the casing 22, and the first elastic element retainer 26a can be rotated with respect to the casing 22. When the first retainer 24a is the latch mechanism, the first elastic element retainer 26a can be set in the rotatable state with respect to the casing 22 by releasing the latch.

Figure 9A:
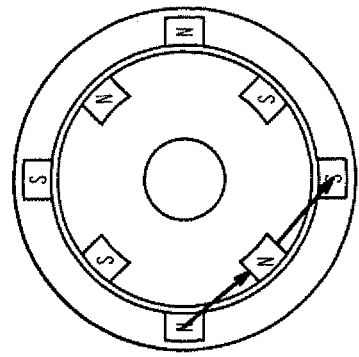
FIGS. 9A~9C are diagrams showing a torque applied to a rotation element from a torque control mechanism according to a first alternative configuration of the present disclosure.
Figure 9A:
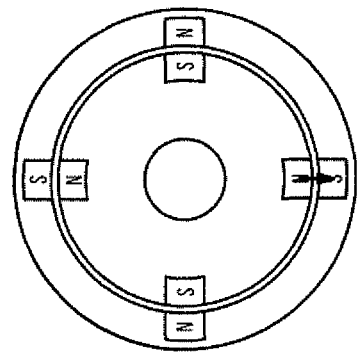
Figure 9A:
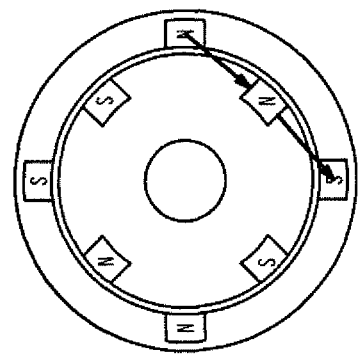
Figure 9A:
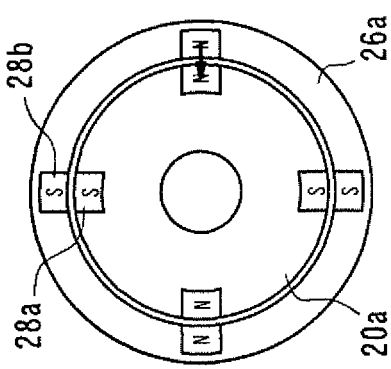
Figure 9B:
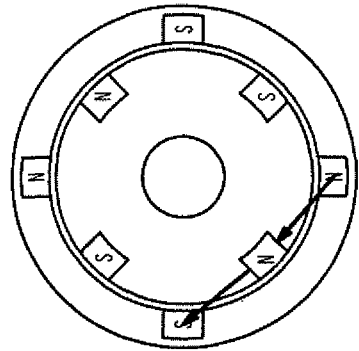
Figure 9B:
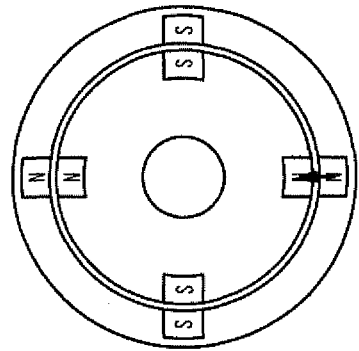
Figure 9B:
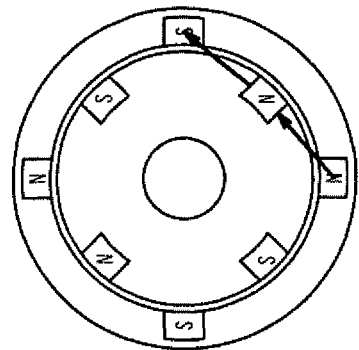
Figure 9B:
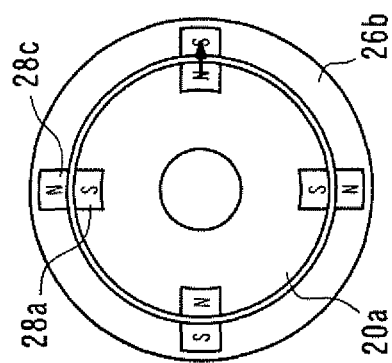

For example, as shown in FIGS. 9A and 9B, a positional relationship between the second magnet 28b retained on the first elastic element retainer 26a and the first magnet 28a retained on the rotor 20a may be set in an opposite phase (180° phase difference) with respect to a positional relationship between the third magnet 28c retained on the second elastic element retainer 26b and the first magnet 28a retained on the rotor 20a. In addition, as shown in FIGS. 10A and 10B, a positional relationship between the second magnet 28b retained on the first elastic element retainer 26a and the first magnet 28a retained on the rotor 20a may be set in the same phase (0 phase difference) as a positional relationship between the third magnet 28c retained on the second elastic element retainer 26b and the first magnet 28a retained on the rotor 20a.

Figure 9C:
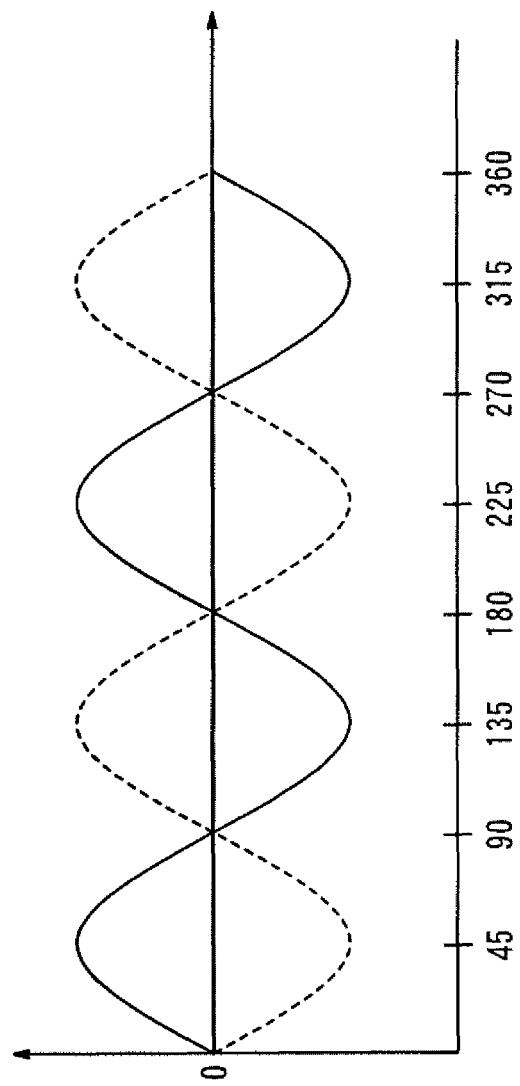

In the state of opposite phase (180° phase difference) shown in FIG. 9, as shown by a thin solid line of FIG. 9C, a torque is periodically applied to the rotation element 20 by a magnetic force between the second magnet 28b retained on the first elastic element retainer 26a and the first magnet 28a retained on the rotor 20a. Further, as shown by a thin broken line of FIG. 9C, a torque is periodically applied to the rotation element 20 by a magnetic force between the third magnet 28c retained on the second elastic element retainer 26b and the first magnet 28a retained on the rotor 20a. These torques cancel each other out, and, as shown by a thick solid line of FIG. 9C, the torque applied to the rotation element 20 is set to zero.

Figure 10C:
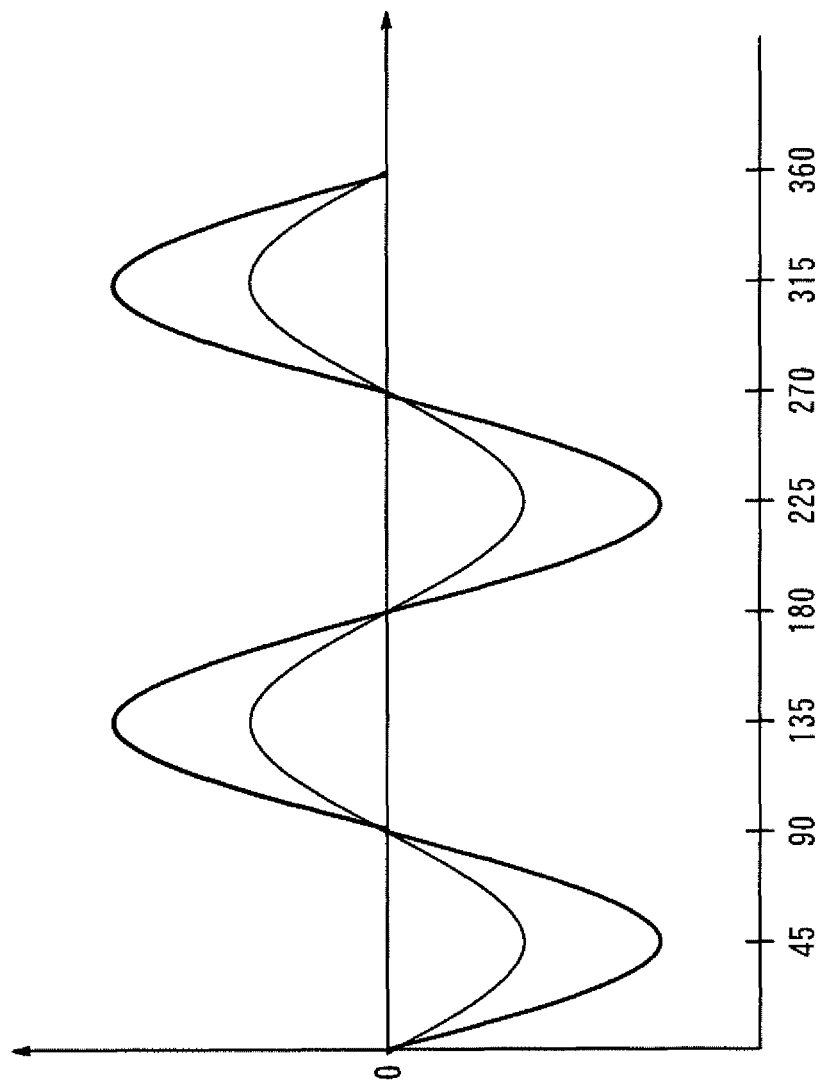

In contrast, in the state of the same phase (0 phase difference) shown in FIG. 10, as shown by a thin solid line of FIG. 10C, a torque is periodically applied to the rotation element 20 by a magnetic force between the second magnet 28b retained on the first elastic element retainer 26a and the first magnet 28a retained on the rotor 20a. In addition, a torque applied to the rotation element 20 by a magnetic force between the third magnet 28c retained on the second elastic element retainer 26b and the first magnet 28a retained on the rotor 20a is in the same phase. Therefore, as shown by a thick solid line of FIG. 10C, the combined torque applied to the rotation element 20 is a torque in which the torques applied to the rotation element 20 from the first elastic element retainer 26a and the second elastic element retainer 26b are added.

As described, in the torque control mechanism 200 of the present embodiment, by changing the phase of the torque applied to the rotation element 20 from the elastic structure formed from the first elastic element retainer 26a and the second magnet 28b, it becomes possible to set the combined torque applied to the rotation element variable.

In the torque control mechanism 200, the torque can be completely cancelled out by setting the phases to differ by 180°. Thus, the following Equation (1) is satisfied when a torque in a phase range of 0 to 180° is $T_{0\text{-}180}$ and a torque in a phase range of 180° to 360° is $T_{180\text{-}360}$.

$$T_{0\text{-}180} = -T_{180\text{-}360} \quad (1)$$

By employing a structure which satisfies Equation (1) as in the torque control mechanism 200, it becomes possible to change the torque in a wider range, and to enable a zero-torque control in which the torque is set to zero when it is not necessary to generate a torque.

Second Alternative Configuration

Figure 11A:
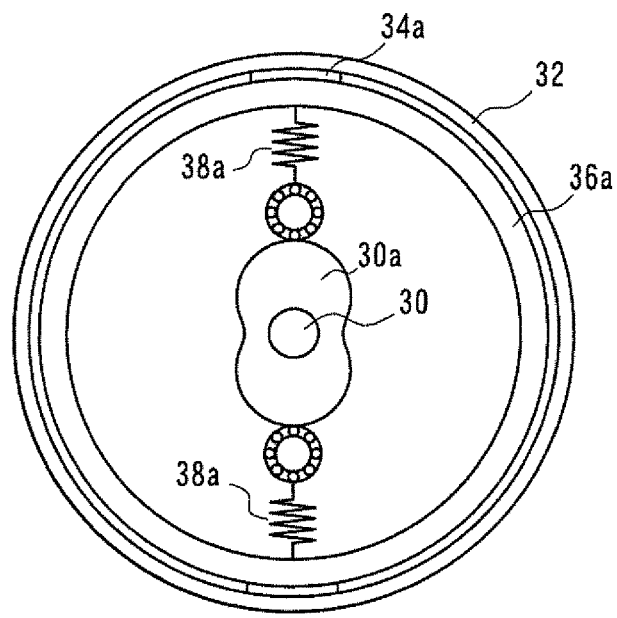
FIGS. 11A and 11B are diagrams showing a structure of a torque control mechanism according to a second alternative configuration of the present disclosure.
Figure 11B:
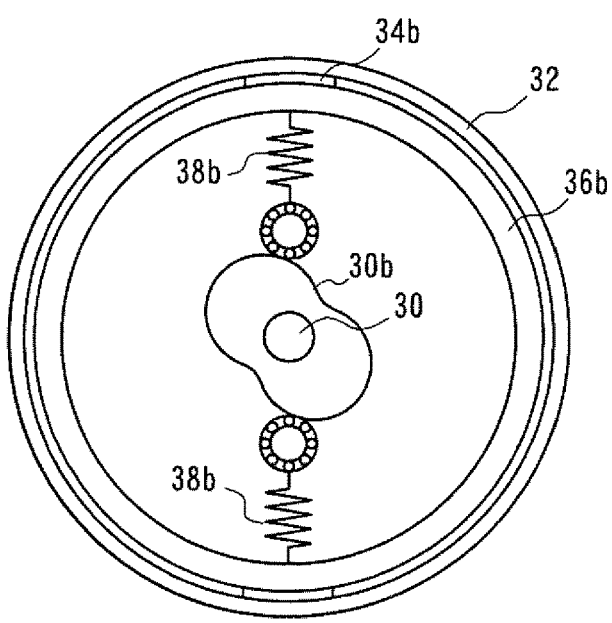

As another structure which satisfies Equation (1), a torque control mechanism 300 which uses a cam as shown in FIGS. 11A and 11B may alternatively be employed. The torque control mechanism 300 comprises a rotation element 30, a casing 32, a retainer 34 (a first retainer 34a and a second retainer 34b), an elastic element retainer 36 (a first elastic element retainer 36a and a second elastic element retainer 36b), and an elastic element 38 (a first elastic element 38a and a second elastic element 38b).

The rotation element 30 has a structure in which cams 30a and 30b are provided on a shaft. The rotation element 30 is desirably formed from a material having mechanical strength.

The casing 32 is a circular tubular member which stores therein the rotation element 30, the retainer 34, the elastic element retainer 36, and the elastic element 38. The casing 32 is an approximately circular tubular shaped member having an inner size larger than an outer size of the elastic element retainer 36. The casing 32 may be formed from a metal or the like having mechanical strength.

The elastic element retainer 36 comprises the first elastic element retainer 36a and the second elastic element retainer 36b. The first elastic element retainer 36a and the second elastic element retainer 36b are members to which the first elastic element 38a and the second elastic element 38b are respectively fixed. The first elastic element retainer 36a and the second elastic element retainer 36b may be circular tubular members having outer sizes smaller than an inner size of the casing 22. The first elastic element retainer 36a and the second elastic element retainer 36b are placed in the casing 32, aligned along the rotational axis. The first elastic element retainer 36a and the second elastic element retainer 36b are desirably formed from a material having mechanical strength, in particular, a magnetic material.

The retainer 34 comprises the first retainer 34a and the second retainer 34b. The first retainer 34a is a member which retains the first elastic element retainer 36a in a manner to not allow rotation thereof with respect to the casing 32. The second retainer 34b is a member which retains the second elastic element retainer 36b to not allow rotation thereof with respect to the casing 32. Here, the first retainer 34a and the second retainer 34b are also units which maintain the first elastic element retainer 36a and the second elastic element retainer 36b on the casing 32 in a manner to allow relative rotation with the rotational axis as a center. For example, the second retainer 34b may be an adhesive or the like which completely fixes the second elastic element retainer 36b to the casing 32, and the first retainer 34a may be a latch mechanism or the like which can allow relative rotation of and can fix the first elastic element retainer 36a with respect to the casing 32.

The elastic element 38 comprises the first elastic element 38a and the second elastic element 38b. The first elastic element 38a and the second elastic element 38b have structures in which a member which generates an elastic force and a bearing are combined. The member which generates the elastic force is not particularly limited, and may be, for example, a spring, a rubber, or the like. One end of the elastic element of the first elastic element 38a is fixed on an inner surface of the first elastic element retainer 36a, and the other end is fixed to the bearing. The bearing is placed in a manner to press an outer circumferential surface of the cam 30a of the rotational element 30, to apply an elastic force to the cam 30a. One end of the elastic element of the second elastic element 38b is fixed on an inner surface of the second elastic element retainer 36b, and the other end is fixed to the bearing. The bearing is placed in a manner to press an outer circumferential surface of the cam 30b of the rotation element 30, to apply an elastic force to the cam 30b.

The torque control mechanism 300 comprises an elastic structure formed from the cam 30a placed at an outer circumference of the rotation element 30 and the first elastic element 38a placed at an inner circumference of the first elastic element retainer 36a, and an elastic structure formed from a pair of the cam 30b placed at the outer circumference of the rotation element 30 and the second elastic element 38b placed at an inner circumference of the second elastic element retainer 36b. In other words, the torque control mechanism 300 comprises two pairs of elastic structures which apply elastic forces to the rotation element 30 when the rotation element 30 rotates.

In addition, with the first retainer 34a, the first elastic element retainer 36a is set in a rotatable state with respect to the casing 32, and the first elastic element retainer 36a can be rotated with respect to the casing 32. When the first retainer 36a is the latch mechanism, the first elastic element retainer 36a can be set in the rotatable state with respect to the casing 32 by releasing the latch. With such a configuration, a relationship between the cam 30a of the rotation element 30 and the first elastic element 38a can be changed, and a phase of the torque which is periodically applied to the rotation element 30 from the first elastic element 38a can be changed.

As described, in the torque control mechanism 300 also, by changing the phase of the torque applied to the rotation element 30 from the elastic structure formed from the first elastic element retainer 36a and the first elastic element 38a, it becomes possible to set the combined torque applied to the rotation element 30 variable.

In addition, above-described Equation (1) can be satisfied by suitably selecting the shapes of the cam 30a and the cam 30b. For example, as shown in FIGS. 11A and 11B, shapes may be employed in which Equation (1) is satisfied with a sine wave-like torque. With such a configuration, the torque can be changed in a wider range, and a zero-torque control is enabled in which the torque is set to zero when it is not necessary to generate a torque.

Application to Damper Apparatus

Each of the torque control mechanisms 100~300 described above functions as a torque control mechanism which controls a torque with respect to a rotation element. By employing a structure in which the casings 12, 22, and 32 can be connected to another rotational axis, it is possible to make the torque control mechanism function as a damper apparatus with respect to the rotation element.

Figure 12:
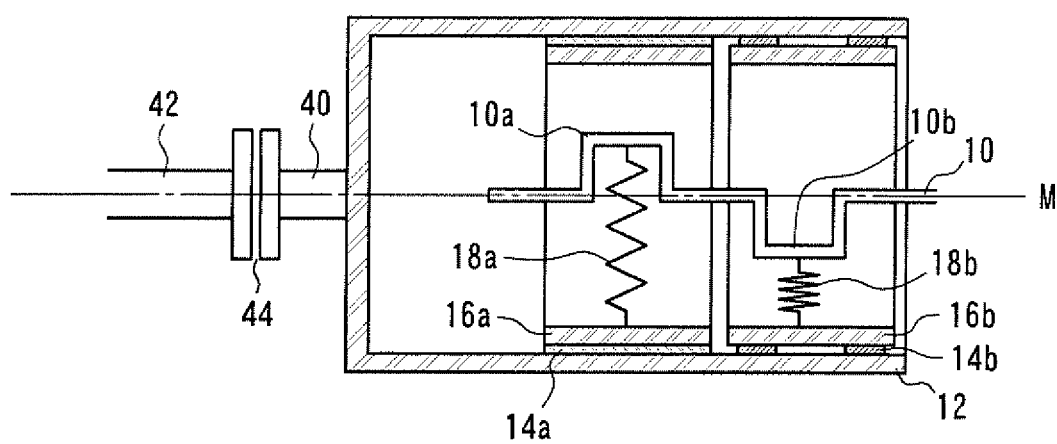
FIG. 12 is a diagram showing a structure of a damper apparatus which uses a torque control mechanism according to the present disclosure.

FIG. 12 shows an example configuration in which the torque control mechanism 100 is applied to a damper apparatus 400. The damper apparatus 400 has a structure in which a rotational shaft 40 having the rotational axis M as the center of rotation is connected to the casing 12 of the torque control mechanism 100 and an output shaft 42 is connected via a clutch 44.

According to such a configuration, a transmission torque involved with the phase between the rotation element 10 and the casing 12 is generated via the casing 12. Therefore, by connecting the rotation shaft 40 and the output shaft 42 by the clutch 44, it is possible to transmit the rotation of the rotation element 10 to the output shaft 42 via the casing 12.

In this configuration, the torque control mechanism 100 may be used as a torsional damper. When a damping characteristic with respect to the rotation element 10 is to be increased, control is applied to reduce the overall torque applied to the rotation element 10 from the torque control mechanism 100, and, when the torque to be output from the rotation element 10 is to be increased, control may be applied to increase the overall torque applied to the rotation element 10.

Alternatively, a similar torsional damper apparatus may be formed by applying the torque control mechanism 200 or 300 in place of the torque control mechanism 100.

In a case of a typical torsional damper, because a spring rigidity is monotonically increasing and is linear, even when the phase is changed by placing a plurality of springs, a total torque applied to the rotation element does not change. On the other hand, when the damper apparatus is formed by applying the torque control mechanism 100, 200, or 300, the total torque applied to the rotation element can be changed by changing the phase. Therefore, when the damping characteristic is of importance, control may be applied to reduce the total torque applied to the rotation element, and, when the rotation response characteristic is of importance, control may be applied to increase the total torque applied to the rotation element.

In addition, because there is a peak of the torque at a predetermined rotational angle (phase), the mechanism may be used as a torque limiter. In this case, unlike the torsional damper of the related art, it is not necessary to use a separate frictional clutch or the like.

Phase Adjustment Mechanism

In the torque control mechanism and the damper apparatus which uses the torque control mechanism described above, the phase of the elastic force and the torque applied to the rotation element from the elastic structure must be adjusted. In the following, a phase adjustment mechanism will be described.

In the above-described torque control mechanism, even when the total torque applied to the rotation element is zero as shown in FIG. 9 or the like, a periodic change occurs in the torque applied to the rotation element from each elastic structure. In other words, the maximum torque and the minimum torque applied from each elastic structure to the rotation element are generated according to the rotation, and, as a reaction force thereof, the maximum torque and the minimum torque are also generated in the elastic element retainer which retains the elastic element, the magnet, or the like. Therefore, in order to retain the elastic element retainer to not allow rotation thereof during the rotation of the rotation element, it is necessary to fix the elastic element retainer by the retainer with a retaining torque which is greater than or equal to the maximum torque, and, in order to adjust the phase, the elastic element retainer must be driven with a torque which is greater than or equal to the retaining torque by the retainer.

Figure 13:
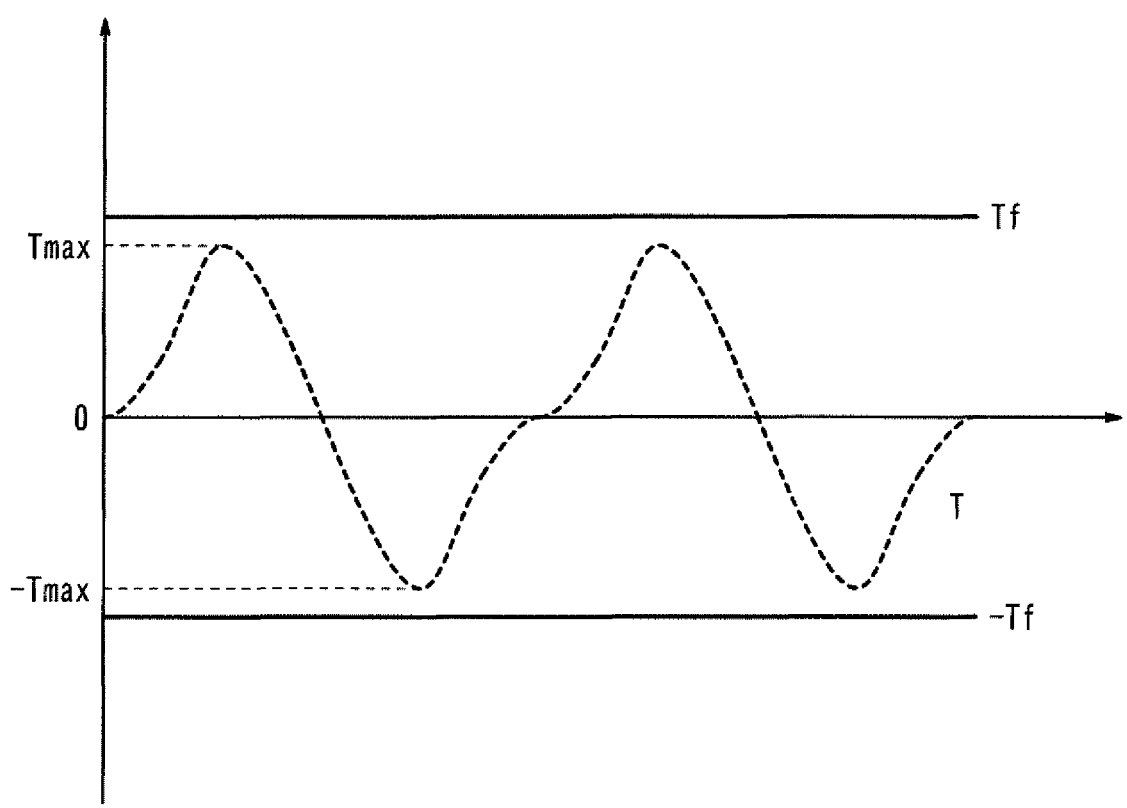
FIG. 13 is a diagram for explaining a principle of a phase adjustment mechanism according to an embodiment of the present disclosure.
Figure 14:
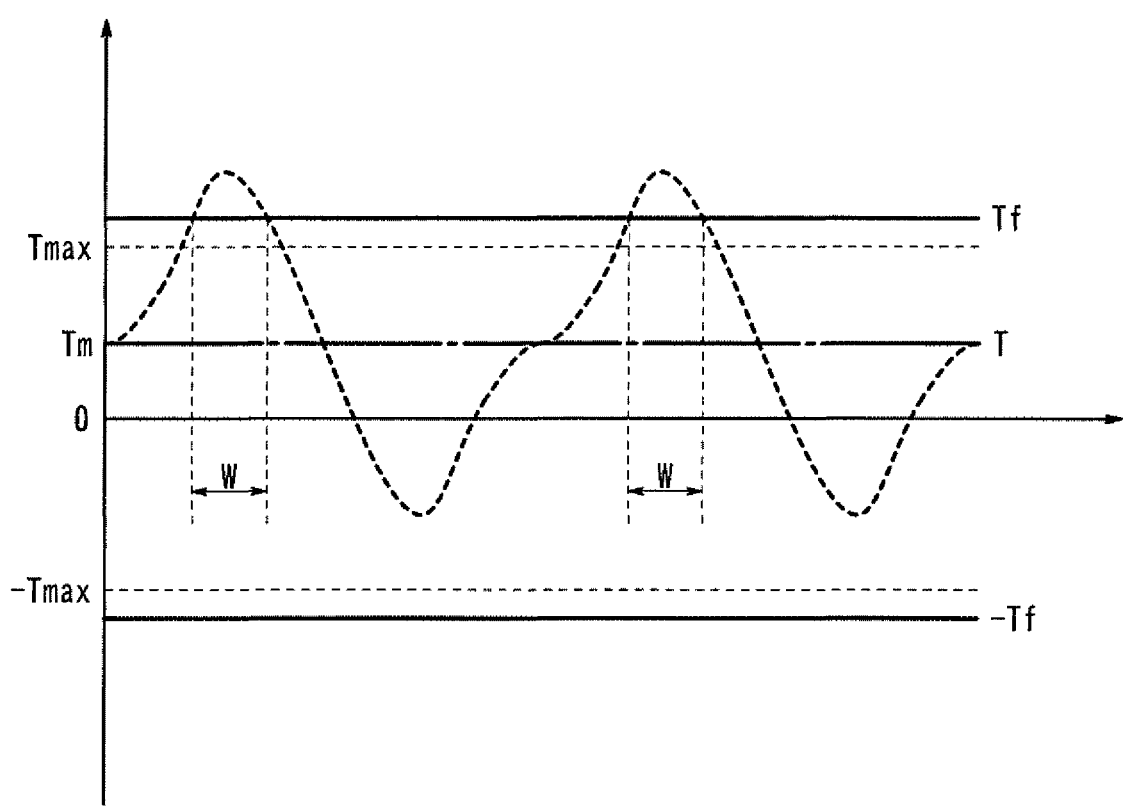
FIG. 14 is a diagram for explaining a principle of a phase adjustment mechanism according to an embodiment of the present disclosure.

With reference to FIGS. 13 and 14, a principle of the phase adjustment mechanism in the present embodiment will be described. In the following description, one direction of rotation (direction in which the torque acts positively) is described, but the reverse direction of the rotation (direction in which the torque acts negatively) is similar, except with the direction of action of the torque reversed.

A broken line in FIG. 13 shows a change with respect to time of a torque T applied to the rotation element from one of the elastic structures of the torque control mechanism. When the torque T which changes periodically is applied, the same torque T is applied to the elastic element retainer which retains the elastic element and the magnet, by the reaction force. Therefore, as shown by a solid line in FIG. 13, by applying a retaining torque $T_f$ which is greater than or equal to the maximum torque $T_{max}$ by the retainer, it becomes possible to retain the elastic element retainer in a manner to not allow movement thereof during the rotation of the rotation element. The retaining torque $T_f$ applied by the retainer may be, for example, a frictional force or the like.

On the other hand, when the torque control is executed in order to change the torque applied to the rotation element, it is necessary to adjust the phase of the elastic element and the magnet retained by the elastic element retainer by applying a drive torque $T_m$ to the elastic element retainer. In this case, as shown by a dot-and-broken line of FIG. 14, the elastic element retainer can be driven by applying the drive torque $T_m$ and providing a period W in which a sum of the drive torque $T_m$ and the maximum torque $T_{max}$ is greater than the retaining torque $T_f$.

That is, when the retaining torque $T_f$ is greater than the maximum torque $T_{max}$, the elastic element retainer does not move in a state where the drive torque $T_m$ is not applied. When the drive torque $T_m$ is applied and a period W is created in which the sum of the drive torque $T_m$ and the maximum torque $T_{max}$ is greater than the retaining torque $T_f$, the elastic element retainer is driven in a direction of application of the drive torque $T_m$ during the period.

In this process, a difference between the retaining torque $T_f$ and the maximum torque $T_{max}$ is set to be smaller than the maximum torque $T_{max}$. Specifically, by setting the retaining torque $T_f$ to be larger than the maximum torque $T_{max}$ and less than two times the maximum torque $T_{max}$, it is possible to set the drive torque $T_m$ to be smaller than the maximum torque $T_{max}$.

Figure 15:
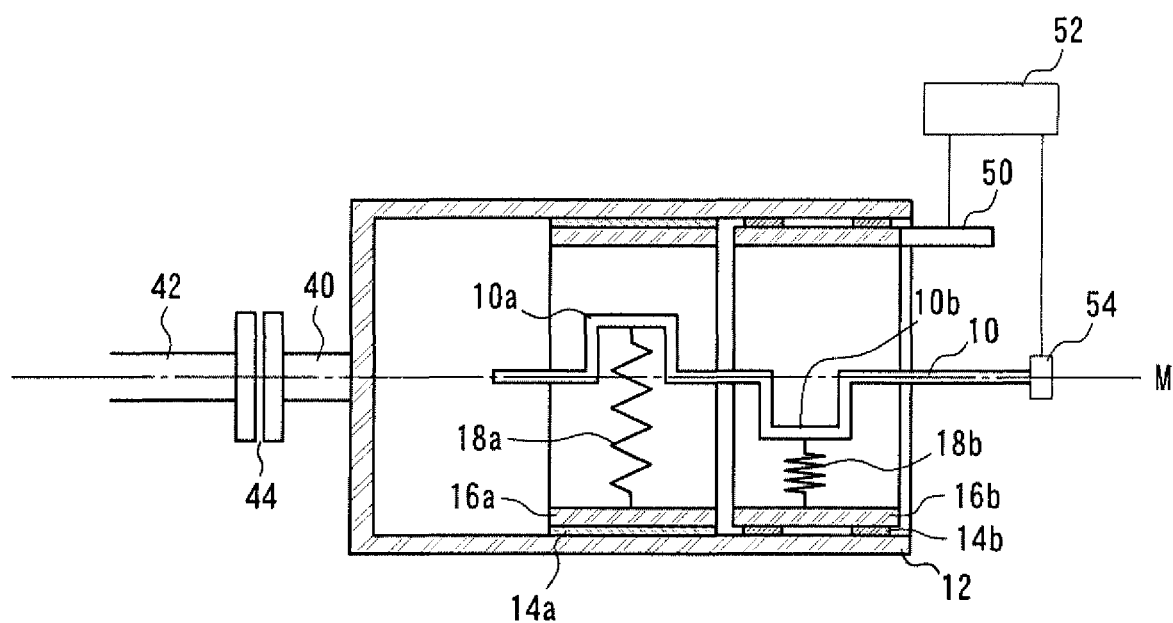
FIG. 15 is a diagram showing a structure of a phase adjustment mechanism according to an embodiment of the present disclosure.

For example, as shown in FIG. 15, a structure is employed in which the torque control mechanism 100 comprises a drive torque application unit 50 and a controller 52. The second retainer 14b is configured to apply a retaining torque $T_f$ (for example, a torque by a frictional force) which is greater than the maximum torque $T_{max}$ applied to the rotation element 10 from the second elastic element 18b and the second elastic element retainer 16b. In such a structure, with control by the controller 52, the drive torque $T_m$ is applied from the drive torque application unit 50 to the second elastic element retainer 16b. The drive torque application unit 50 comprises, for example, an actuator which is fixed to the casing 12 and which applies a drive force in a direction of rotation to the second elastic element retainer 16b. When the drive torque $T_m$ which creates a period in which the sum of the drive torque $T_m$ and the maximum torque $T_{max}$ is greater than the retaining torque $T_f$ is applied, the second elastic element retainer 16b is moved during this period, and the phase of the torque applied to the rotation element 10 can be changed.

In a state where the rotation element is rotating, the drive torque $T_m$ may be continued to be applied, so that the elastic element retainer is driven only during the period W in which the sum of the drive torque $T_m$ and the maximum torque $T_{max}$ is greater than the retaining torque $T_f$.

Alternatively, as shown in FIG. 15, a torque sensor 54 for measuring the torque applied to the rotation element 10 may be provided, and, when it is possible to measure a timing when the maximum torque $T_{max}$ is generated, the drive torque $T_m$ may be applied only during a predetermined period including this timing. By employing a structure in which the drive torque $T_m$ is applied only at the timing when the maximum torque $T_{max}$ is generated, it becomes possible to adjust the phase with less energy consumption, and to facilitate the control of the phase angle.

Figure 16:
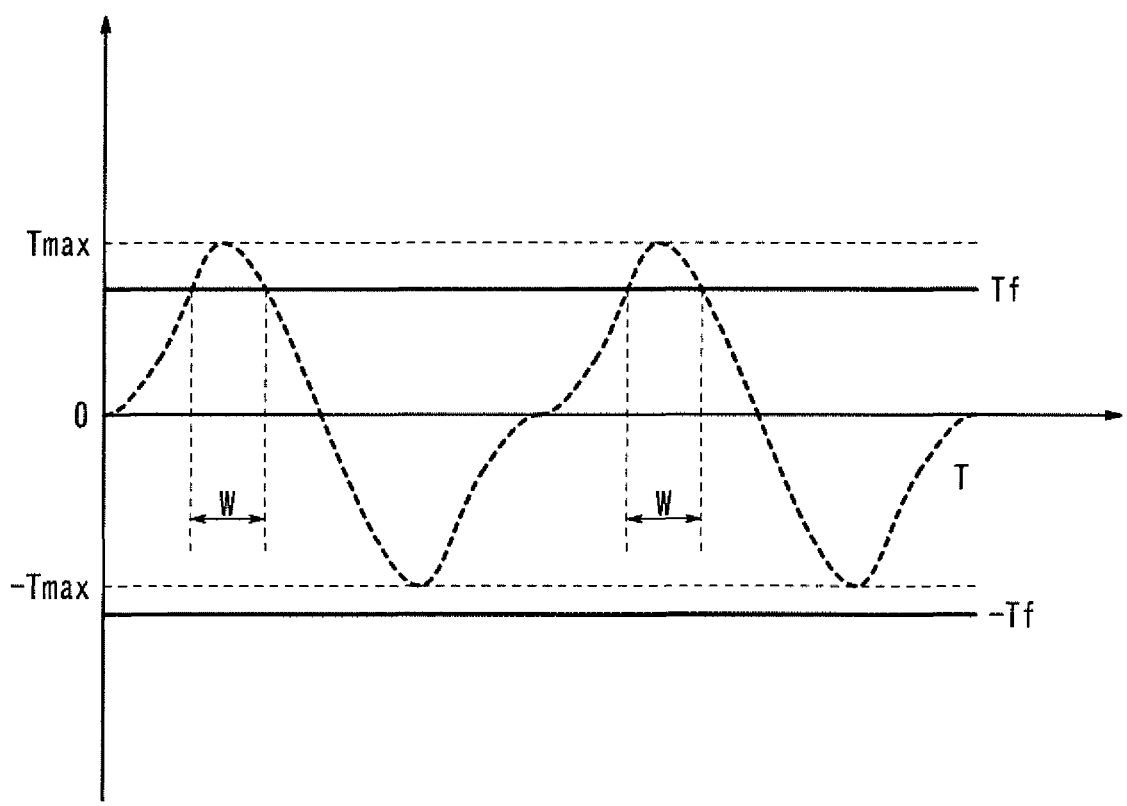
FIG. 16 is a diagram for explaining a principle of a phase adjustment mechanism according to an embodiment of the present disclosure.

Alternatively, a unit which reduces the retaining torque $T_f$ may be provided in place of applying the drive torque $T_m$. That is, as shown in FIG. 16, by creating a period W in which the maximum torque $T_{max}$ is greater than the retaining torque $T_f$, in place of applying the drive torque $T_m$, the elastic element retainer is driven during this period.

Figure 17:
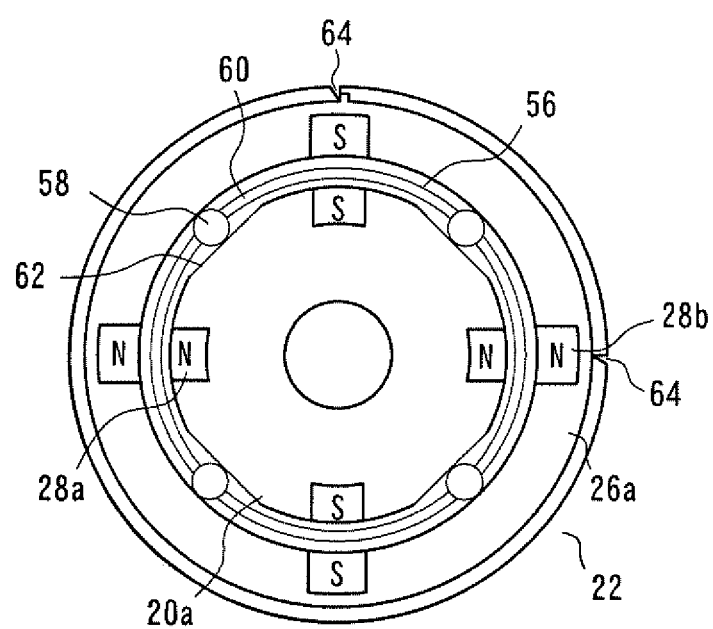
FIG. 17 is a diagram showing a structure of a phase adjustment mechanism according to an embodiment of the present disclosure.

For example, as shown in FIG. 17, a structure is employed in which, in the torque control mechanism 200, a selectable two-way clutch 56 is employed as the retainer 24a. The selectable two-way clutch 56 comprises a roller 58 and a retaining device 60. The retaining device 60 is a circular tubular member having an inner size which is slightly larger than the rotor 20a, and an outer size which is slightly smaller than the first elastic element retainer 26a. The roller 58 is a spherical or circular tubular member, and is retained by the retaining device 60 in a manner to allow rotation with respect to the retaining device 60. The selectable two-way clutch 56 comprising the roller 58 and the retaining device 60 is placed in a gap between the rotor 20a and the first elastic element retainer 26a. In this structure, a cutout portion 62, having a maximum width larger than an outer size of the roller 58 at a position where the roller 58 is placed, is provided on an outer circumference of the rotor 20a.

Figure 18A:
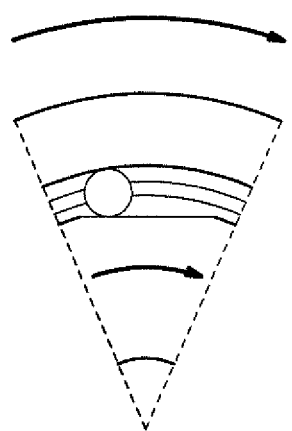
FIGS. 18A~18C are diagrams for explaining an operation of a phase adjustment mechanism according to an embodiment of the present disclosure.
Figure 18B:
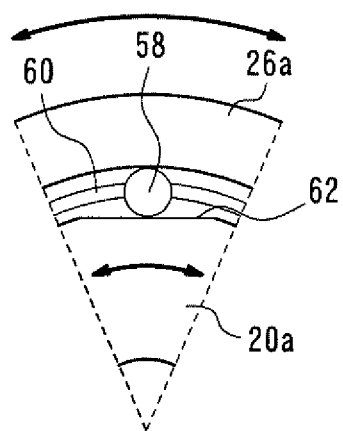
Figure 18C:
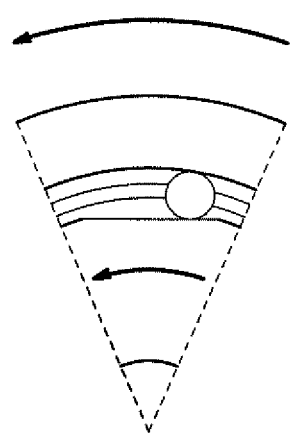

With reference to FIG. 18, an operation of the selectable two-way clutch 56 will be described. The selectable two-way clutch 56 operates to allow transmission of motive power only in a selected direction. In a state where the roller 58 is at a center portion of the cutout portion 62 of the rotor 20a as shown in FIG. 18B, the outer circumference of the roller 58 is not in contact with the outer circumference of the rotor 20a and the inner circumference of the first elastic element retainer 26a, and the torque by the rotation of the rotor 20a is not transmitted to the first elastic element retainer 26a. In a state where the selectable two-way clutch 56 is rotated to the left and the roller 58 is placed at a left end of the cutout portion 62 of the rotor 20a as shown in FIG. 18A, the outer circumference of the roller 58 is in contact with the outer circumference of the rotor 20a and the inner circumference of the first elastic element retainer 26a. In this case, when the rotor 20a is rotated to the right (clockwise direction), the torque is transmitted to the first elastic element retainer 26a, and, when the rotor 20a is rotated to the left (counterclockwise direction), the torque is not transmitted to the first elastic element retainer 26a. In a state where the selectable two-way clutch 56 is rotated to the right and the roller 58 is placed at a right end of the cutout portion 62 of the rotor 20a as shown in FIG. 18C, the outer circumference of the roller 58 is in contact with the outer circumference of the rotor 20a and the inner circumference of the first elastic element retainer 26a. In this case, when the rotor 20a is rotated to the left (counterclockwise direction), the torque is transmitted to the first elastic element retainer 26a, and, when the rotor 20a is rotated to the right (clockwise direction), the torque is not transmitted to the first elastic element retainer 26a. In this manner, with the use of the selectable two-way clutch 56, it is possible to select a direction of transmission of the torque of the rotor 20a to the first elastic element retainer 26a.

By selecting the rotation direction of the first elastic element retainer 26a by the selectable two-way clutch 56 and using the reaction force between the rotor 20a and the first elastic element retainer 26a, it is possible to adjust the phase between the first magnet 28a retained on the rotor 20a and the second magnet 28b retained on the first elastic element retainer 26a. By suitably providing a stopper 64 or the like on the casing 22 so that the first elastic element retainer 26a is stopped at an appropriate phase, it becomes possible to move the first elastic element retainer 26a to a position of the appropriate phase with respect to the rotor 20a. Alternatively, a structure may be employed in which the phase can be finely changed by providing a multiple-stage latch mechanism between the casing 22 and the first elastic element retainer 26a, in place of the stopper 64.

First Embodiment of Torque Variation Suppressing Apparatus

Figure 19:
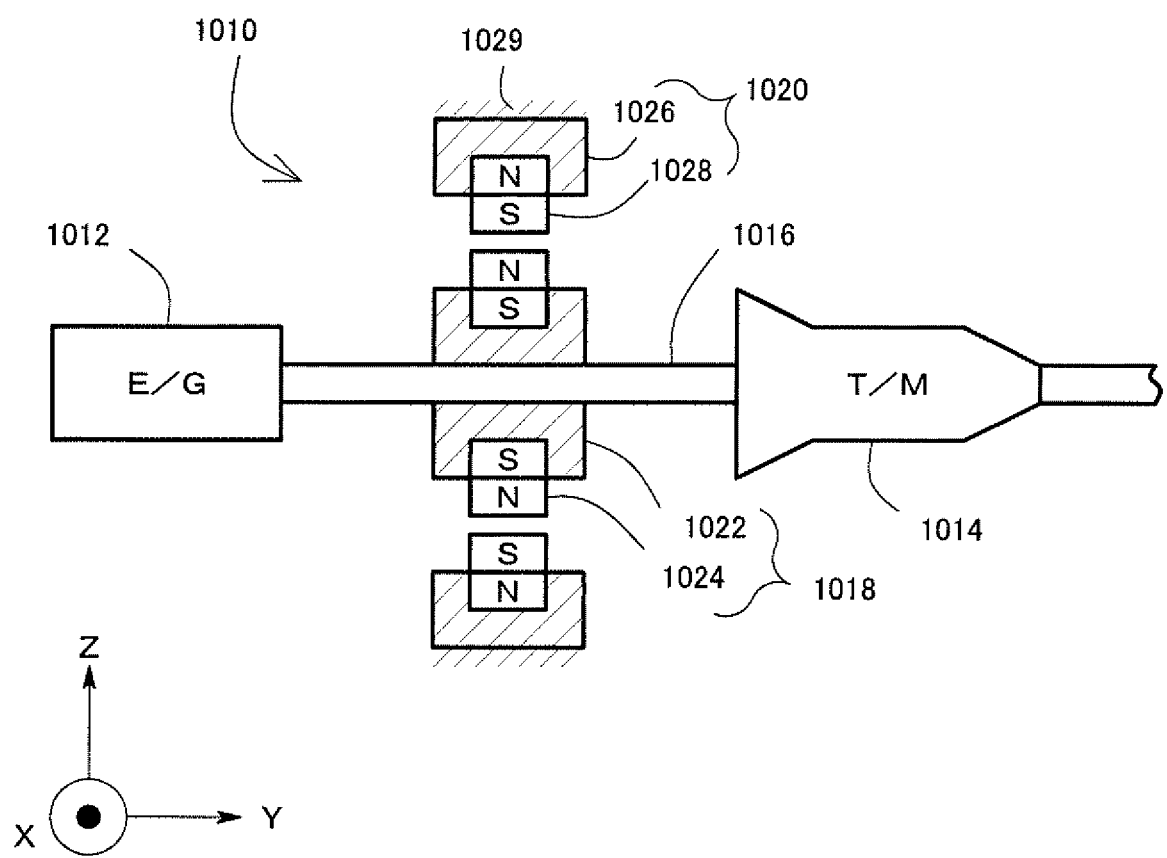
FIG. 19 is a diagram for explaining an overview of a torque variation suppressing apparatus according to a first embodiment of the present disclosure.

FIG. 19 exemplifies a part of a rotation transmission system including a torque variation suppressing apparatus 1010 according to a first embodiment of the present disclosure. In FIGS. 19~21, 23, 24, 27, 28, and 31~34, an X axis, a Y axis, and a Z axis which are orthogonal to each other are shown. The Z axis shows a vertical direction, with an upward direction being a positive direction, the Y axis shows an axial direction of a shaft 1016, and the X axis is a line of normal with respect to a Z-Y plane.

The torque variation suppressing apparatus 1010 has an internal combustion engine 1012 which is a rotational drive source (torque input source) as an input side, and a transmission 1014 as an output side. The internal combustion engine 1012 and the transmission 1014 are connected to each other by the shaft 1016 which is a drive transmission shaft. A torque is transmitted from the internal combustion engine 1012 via the shaft 1016 to the transmission 1014.

In the internal combustion engine 1012, the torque varies in a one-rotation period of a crank pin. For example, a torque variation of an integer-multiple period of the rotation rate is generated. The torque variation suppressing apparatus 1010 in the present embodiment suppresses (damps) the torque variation of the internal combustion engine 1012.

Figure 20:
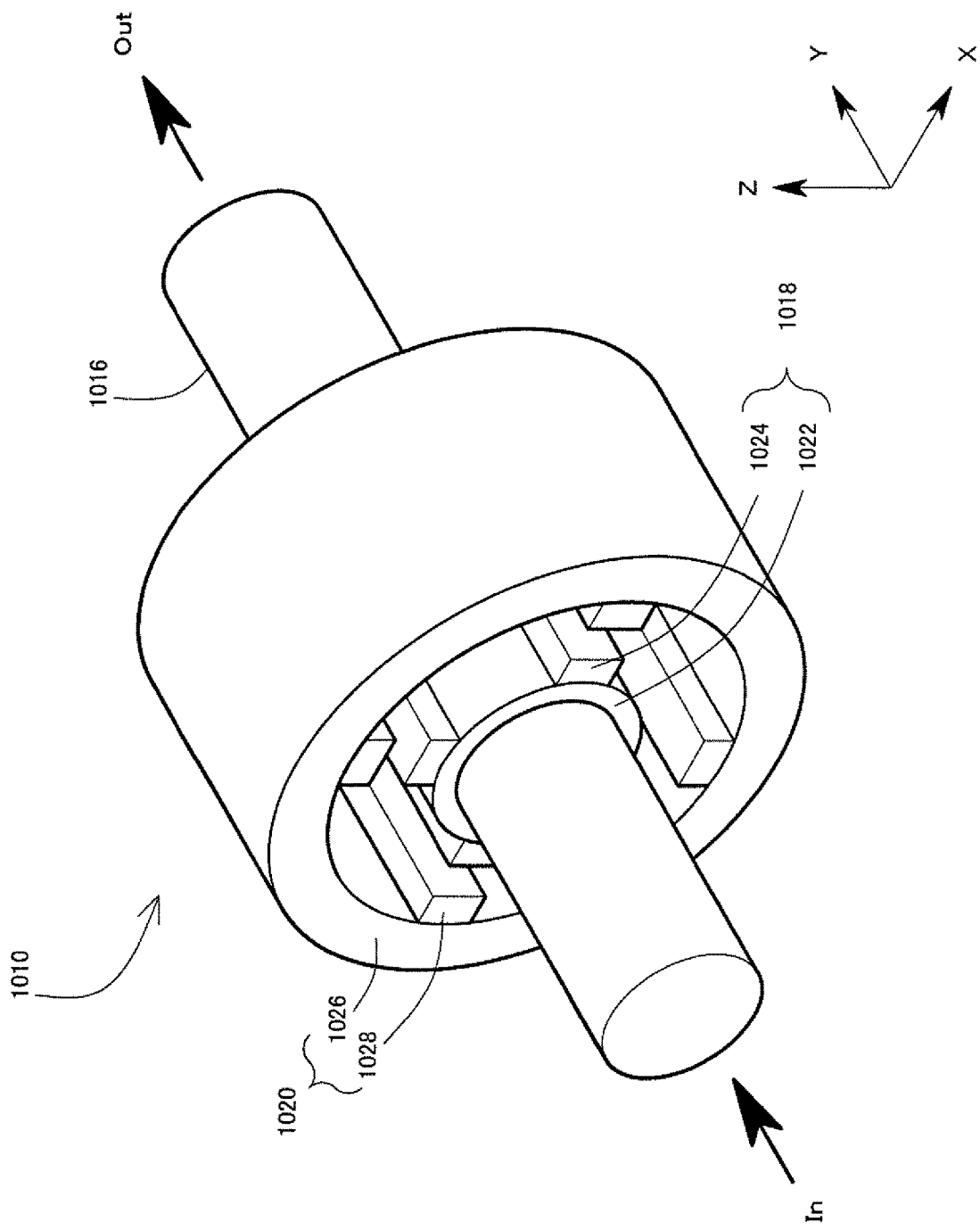
FIG. 20 is a perspective diagram exemplifying the torque variation suppressing apparatus according to the first embodiment of the present disclosure.

FIG. 20 shows a perspective diagram of the torque variation suppressing apparatus 1010. As shown in FIG. 20, a part of the torque variation suppressing apparatus 1010 is provided on the shaft 1016, and another part thereof is provided separated (in no mechanical connection relationship) from the shaft 1016 and the rotation transmission system including the shaft 1016. As the former part, the torque variation suppressing apparatus 1010 includes a rotation unit 1018, and as the latter part, the torque variation suppressing apparatus 1010 includes an outer circumferential portion 1020.

The rotation unit 1018 comprises a boss 1022 and a plurality of magnets 1024. The boss 1022 is fixedly coupled to the shaft 1016. In order to prevent relative rotation between the shaft 1016 and the boss 1022, a key groove may be provided on an outer surface of the shaft 1016 having the circular column shape, a key groove which conforms with the key groove may be provided on an inner circumferential surface of the boss 1022 having a circular tubular shape, and a spline structure which couples the key grooves may be provided.

On an outer circumferential surface of the boss 1022, the plurality of magnets 1024 are provided. The plurality of magnets 1024 may be permanent magnets, and are formed from, for example, an alnico magnet and a neodymium magnet. As will be described later, the magnet 1024 functions as an urging unit which cooperates with a magnet 1028 on the outer circumferential portion 1020, to switch between a force in the same direction as the rotation of the shaft 1016 and a force in the opposite direction from the rotation, according to a relative rotational position between the rotation unit 1018 and the outer circumferential portion 1020.

Figure 21:
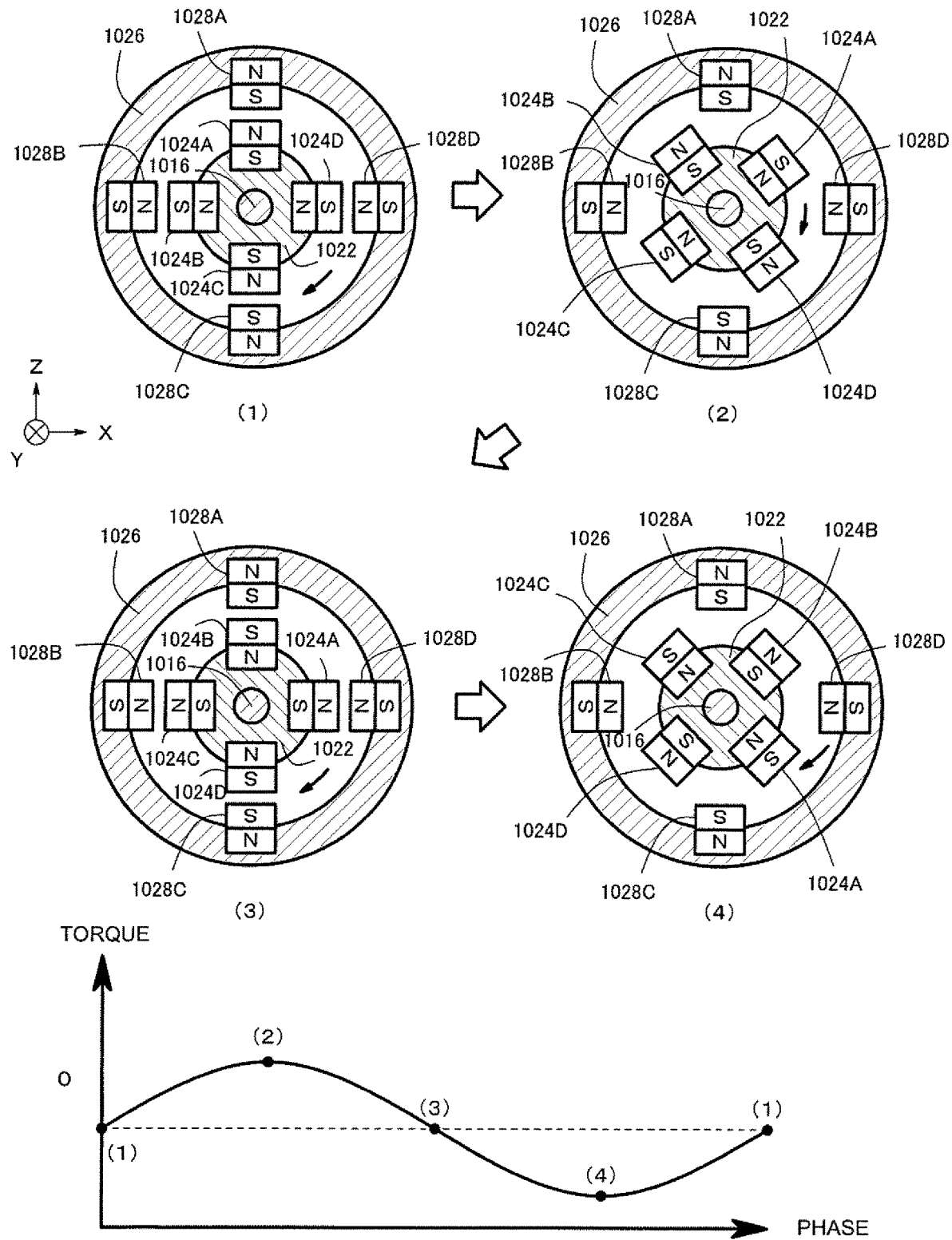
FIG. 21 is a diagram for explaining a behavior of the torque variation suppressing apparatus according to the first embodiment of the present disclosure.

As exemplified in FIG. 21, the magnet 1024 is placed along a circumferential direction of the boss 1022. In the placement, the magnets 1024A~1024D are placed so that the poles exposed on the outer surface are alternately switched (N pole/S pole) around the circumference. In the example configuration of FIGS. 20 and 21, four magnets are shown as the magnets 1024 placed on the outer circumferential surface of the boss 1022, but the present disclosure is not limited to such a configuration, and a plurality of magnets may be provided.

The outer circumferential portion 1020 comprises a casing 1026 and a plurality of magnets 1028A~1028D. The casing 1026 has, for example, a circular tubular shape, and is provided concentric with the rotation unit 1018 with reference to an axial center of the shaft 1016. Further, the outer circumferential portion 1020 is provided separated (in no mechanical connection relationship) from the shaft 1016, the rotation unit 1018, and other rotation transmission systems. For example, a predetermined gap (space) is provided between an inner circumferential surface of the outer circumferential portion 1020 and an outer circumferential surface of the boss 1022. The casing 1026 is fixed, for example, on a fixation unit 1029 (to allow no rotation) such as a base shown in FIG. 19.

On an inner circumferential surface of the casing 1026, the plurality of magnets 1028A~1028D are provided. Similar to the magnets 1024A~1024D on the rotation unit, the plurality of magnets 1028A~1028D may be permanent magnets, and are formed from, for example, the alnico magnet or the neodymium magnet. As will be described later, the magnets 1028A~1028D function as an urging unit similar to the magnets 1024A~1024D of the rotation unit 1018.

As exemplified in FIG. 21, the magnets 1028A~1028D are placed along a circumferential direction of the casing 1026. In the placement, the magnets 1028A~1028D are placed so that the poles exposed on the side of the shaft 1016 are alternately switched (N pole/S pole) around the circumference. A predetermined gap (space) is provided between the magnets 1028A~1028D of the outer circumferential portion 1020 and the magnets 1024A~1024D of the rotation unit 1018. In addition, the magnets 1028 of the outer circumferential portion 1020 and the magnets 1024 of the rotation unit 1018 may be provided in the same number.

FIG. 21 shows an example operation of the torque variation suppressing apparatus 1010 of the first embodiment. A lower part of FIG. 21 shows a change of the torque applied to the shaft 1016 from the torque variation suppressing apparatus 1010. A horizontal axis represents a phase of the shaft 1016, and a vertical axis shows the torque. A positive direction of the vertical axis shows a torque in a same direction as the rotation of the internal combustion engine 1012. A graph at the lower part of FIG. 21 exemplifies the torque (urging force) applied to the shaft 1016 from the torque variation suppressing apparatus 1010 when the shaft 1016 rotates 180°.

As shown in FIG. 21, in the torque variation suppressing apparatus 1010 of the present embodiment, the urging three is switched between the urging force in the same direction as the rotation of the shaft 1016 and the urging force in the opposite direction of the rotation, according to the relative rotational position of the rotation unit 1018 and the outer circumferential portion 1020, by the operations of the magnets 1024A~1024D and 1028A~1028D, serving as the urging unit. In other words, the apparatus comprises a period inversion structure in which the torque (damping torque) changes in positive and negative (same and opposite with respect to the rotation direction of the shaft 1016.

As shown in FIG. 21, the magnets 1024A~1024D on the side of the rotation unit 1018 are placed so that the magnetic poles exposed to the side of the outer circumferential portion 1020 are alternately inverted along the circumferential direction. Similarly, the magnets 1028A~1028D of the outer circumferential portion 1020 are placed so that the magnetic poles exposed on the side of the shaft 1016 are alternately inverted along the circumferential direction.

As shown in (1) in FIG. 21, the magnets 1024A~1024D on the side of the rotation unit 1018 and the magnets 1028A~1028D on the side of the outer circumferential portion 1020 repel each other. In this case, because the forces generated by the magnets 1024A~1024D on the side of the rotation unit 1018 and the magnets 1028A~1028D on the side of the outer circumferential portion 1020 are both in the radial direction, the torque applied by the torque variation suppressing apparatus 1010 is zero.

Next, as shown in (2) in FIG. 21, with the rotation of the shaft 1016, the magnet 1024A of the rotation unit 1018 and the magnet 1028A of the outer circumferential portion 1020 repel each other, and the magnet 1024A and the magnet 1028D of the outer circumferential portion 1020 attract each other. Similarly, the magnet 1024B of the rotation unit 1018 and the magnet 1028B of the outer circumferential portion 1020 repel each other, and the magnet 1024B and the magnet 1028A of the outer circumferential portion 1020 attract each other. The magnet 1024C of the rotation unit 1018 and the magnet 1028C of the outer circumferential portion 1020 repel each other, and the magnet 1024C and the magnet 1028B of the outer circumferential portion 1020 attract each other. The magnet 1024D of the rotation unit 1018 and the magnet 1028D of the outer circumferential portion 1020 repel each other, and the magnet 1024D and the magnet 1028C of the outer circumferential portion 1020 attract each other.

The repulsion forces and the attractive forces are in the same direction as the rotation direction of the shaft 1016. Therefore, a force (torque) in the same direction as the rotation direction is applied to the shaft 1016 by the repulsion and the attraction of the magnets 1024A~1024D of the rotation unit 1018 and the magnets 1028A~1028D of the outer circumferential portion 1020.

Next, as shown in (3) in FIG. 21, similar to (1), the magnets 1024A~1024D of the rotation unit 1018 and the magnets 1028A~1028D of the outer circumferential portion 1020 oppose each other, and repel each other. In this case, the torque applied by the torque variation suppressing apparatus 1010 is zero.

Next, as shown in (4) in FIG. 21, with the rotation of the shaft 1016, the phases of the magnets 1024A~1024D of the rotation unit 1018 and the magnets 1028A~1028D of the outer circumferential portion 1020 are shifted. In this case, the magnet 1024A of the rotation unit 1018 and the magnet 1028C of the outer circumferential portion 1020 repel each other and the magnet 1024A and the magnet 1028D of the outer circumferential portion 1020 attract each other. Similarly, the magnet 1024B of the rotation unit 1018 and the magnet 1028D of the outer circumferential portion 1020 repel each other, and the magnet 1024B and the magnet 1028A of the outer circumferential portion 1020 attract each other. The magnet 1024C of the rotation unit 1018 and the magnet 1028A of the outer circumferential portion 1020 repel each other, and the magnet 1024C and the magnet 1028B of the outer circumferential portion 1020 attract each other. The magnet 1024D of the rotation unit 1018 and the magnet 1028B of the outer circumferential portion 1020 repel each other, and the magnet 1024D and the magnet 1028C of the outer circumferential portion 1020 attract each other.

The repulsion forces and the attraction forces are in the opposite direction from the rotation direction of the shaft 1016. Therefore, a force (torque) in a direction opposite from the rotation direction is applied to the shaft 1016 by the repulsions and attractions of the magnets 1024A~1024D of the rotation unit 1018 and the magnets 1028A~1028D of the outer circumferential portion 1020.

As described, in the torque variation suppressing apparatus 1010 of the present embodiment, an attraction distribution and a repulsion distribution of the magnets 1024A~1024D and the magnets 1028A~1028D are changed according to the relative rotational position of the rotation unit 1018 and the outer circumferential portion 1020, so that the urging force applied on the shaft 1016 is switched between the force in the same direction as and the force in the opposite direction from the rotation of the shaft 1016. After (4) in FIG. 21, the apparatus returns to (1), and the operations from (2) to (4) are subsequently repeated.

Figure 22:
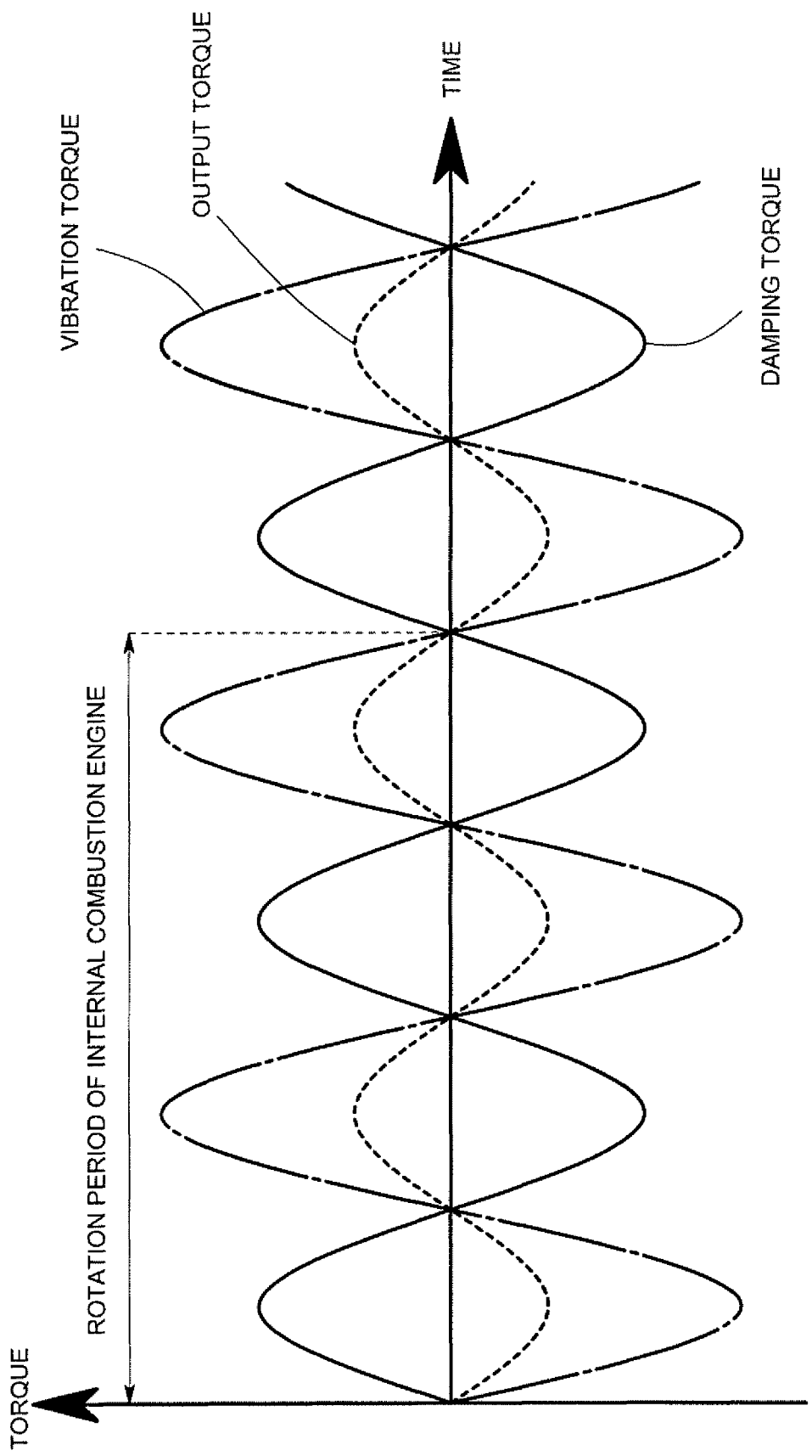
FIG. 22 is a diagram for explaining a damping effect of the torque variation suppressing apparatus according to the first embodiment of the present disclosure.

FIG. 22 shows an example configuration where a torque variation (vibration torque) of the internal combustion engine 1012 and a torque variation (damping torque) of the torque variation suppressing apparatus 1010 are overlapped. A horizontal axis represents time, and a vertical axis represents the torque. The positive direction shows a torque in the same direction as the rotation of the internal combustion engine 1012. The horizontal axis may alternatively be the phase of the shaft 1016.

As shown in FIG. 22, when the torque variation (vibration torque) of the internal combustion engine 1012 and the torque variation (damping torque) due to the rotation of the shaft 1016 of the torque variation suppressing apparatus 1010 are in opposite phases from each other, the torques are cancelled out, and, as shown by a broken line, vibration is suppressed in the output torque.

In having the torque suppressing structure as described above, in the present embodiment, as described above, a part of the torque variation suppressing apparatus (outer circumferential portion 1020) is separated from the rotation system. As a result, a weight load to the rotation transmission system can be reduced.

Second Embodiment of Torque Variation Suppressing Apparatus

Figure 23:
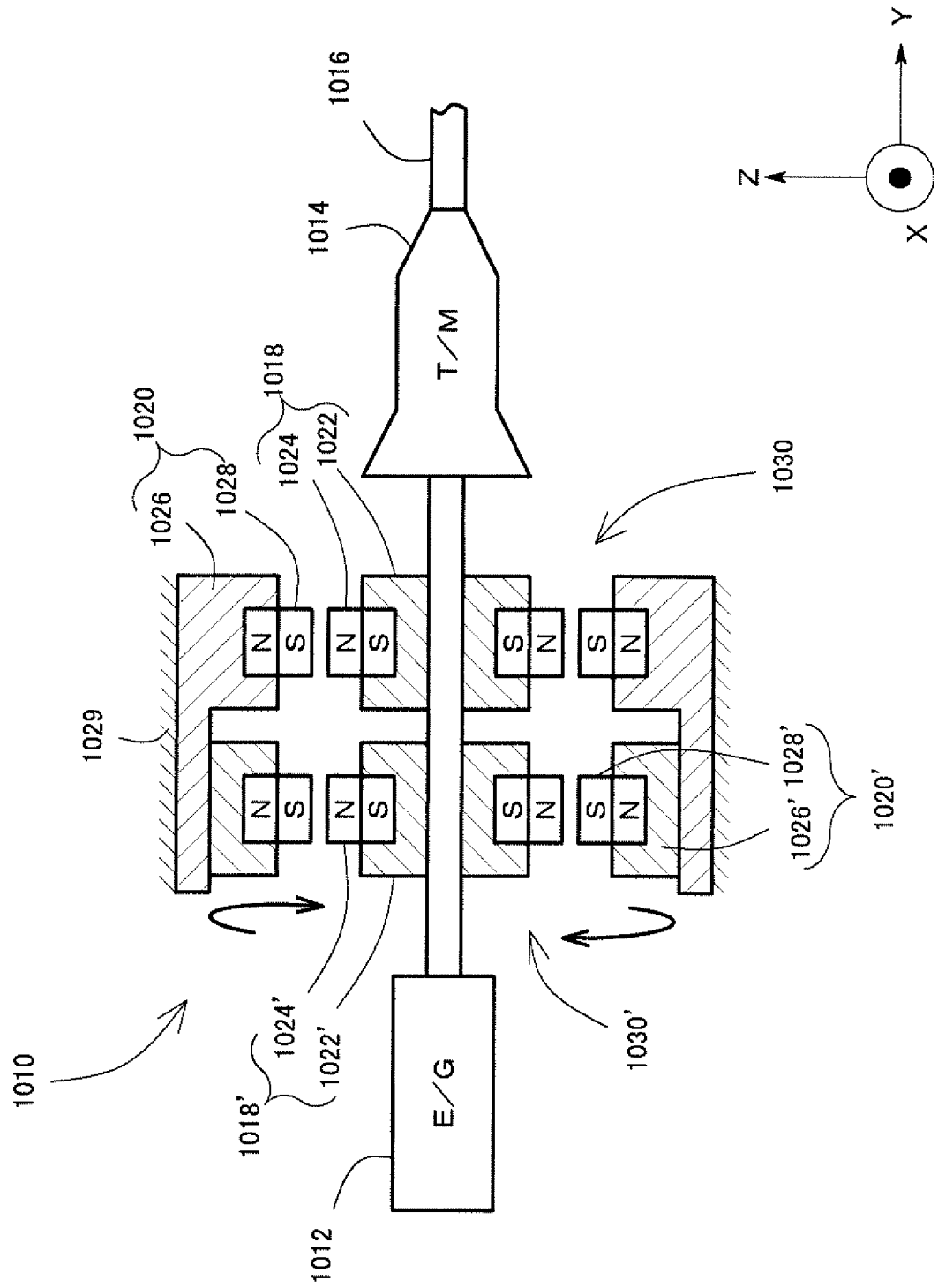
FIG. 23 is a diagram for explaining an overview of a torque variation suppressing apparatus according to a second embodiment of the present disclosure.

FIG. 23 exemplifies a torque variation suppressing apparatus 1010 according to a second embodiment of the present disclosure. As will be described later, in the torque variation suppressing apparatus 1010 of the present embodiment, an amplitude and a phase of the torque to be output can be changed.

The torque variation suppressing apparatus 1010 comprises a first torque generation mechanism 1030 (first pair) including a rotation unit 1018 and an outer circumferential portion 1020, and a second torque generation mechanism 1030' (second pair) including a rotation unit 1018' and an outer circumferential portion 1020'.

The first torque generation mechanism 1030 differs from the torque variation suppressing apparatus 1010 shown in FIG. 20 in that the casing 1026 of the outer circumferential portion 1020 is extended in the axial direction. The second torque generation mechanism 1030' is stored in the extended circular tube.

The second torque generation mechanism 1030' also basically has the same structure as the torque variation suppressing apparatus 1010 shown in FIG. 20, but differs therefrom in that a relative angular position of a casing 1026' with respect to the casing 1026 of the first torque generation mechanism 1030 can be changed. For example, an outer circumferential surface of the casing 1026' is set to be slidable with respect to the inner circumferential surface of the casing 1026. On the other hand, the casing 1026 of the first torque generation mechanism 1030 is fixed on the fixation unit 1029 such as a base in a manner to not allow rotation.

Figure 24:
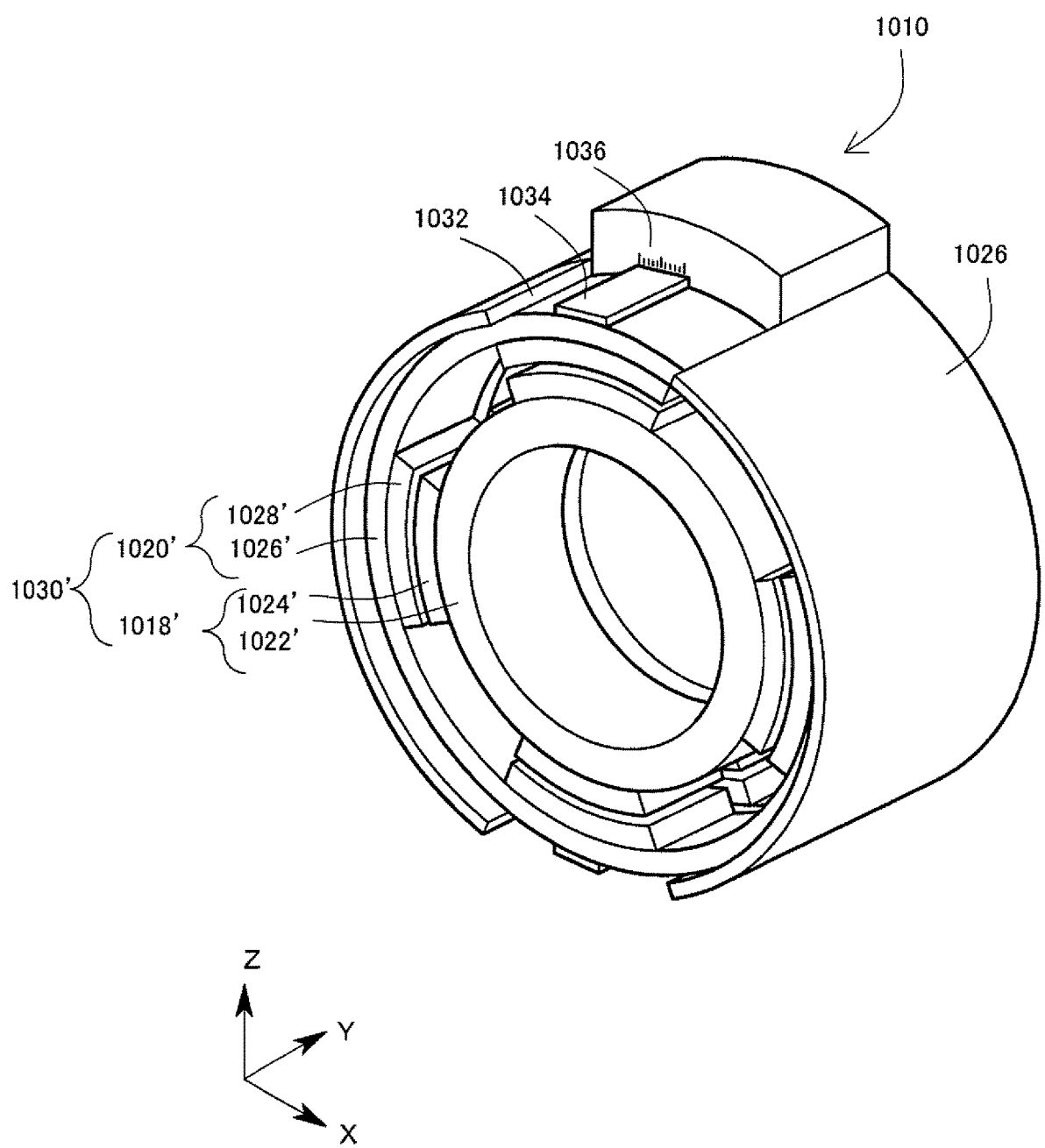
FIG. 24 is a perspective diagram exemplifying the torque variation suppressing apparatus according to the second embodiment of the present disclosure.

With such a structure, the outer circumferential portion 1020' of the second torque generation mechanism 1030' can be set so that the relative angular position thereof with respect to the outer circumferential portion 1020 of the first torque generation mechanism 1030 can be changed. FIG. 24 is a perspective diagram of the torque variation suppressing apparatus 1010 according to the second embodiment. In FIG. 24, the shaft 1016 inserted into the rotation units 1018 and 1018' is not shown.

For example, a cutout 1032 is provided on the casing 1026 of the first torque generation mechanism 1030, and, in a position corresponding to the cutout 1032, a lever 1034 which functions as an angle adjustment mechanism is protruded (to the outer side in the radial direction) from the outer circumferential surface of the casing 1026' of the second torque generation mechanism 1030'. By rotating the lever 1034 around the circumference, the outer circumferential portion 1020' of the second torque generation mechanism 1030' moves relative to the outer circumferential portion 1020 of the first torque generation mechanism 1030.

Further, on a surface of the casing 1026 of the first torque generation mechanism 1030 opposing the lever 1034 in the axial direction, a graduation 1036 is provided, so as to enable judgment of the relative angular position of the outer circumferential portion 1020' of the second torque generation mechanism 1030' with respect to the outer circumferential portion 1020 of the first torque generation mechanism 1030.

An example operation of such a torque variation suppressing apparatus 1010 having the first torque generation mechanism 1030 and the second torque generation mechanism 1030' will now be described with reference to FIGS. 25 and 26. In all graphs, a horizontal axis represents the time and a vertical axis represents the torque. Similar to FIG. 21, the horizontal axis may alternatively represent the rotational phase of the shaft 1016.

Figure 25:
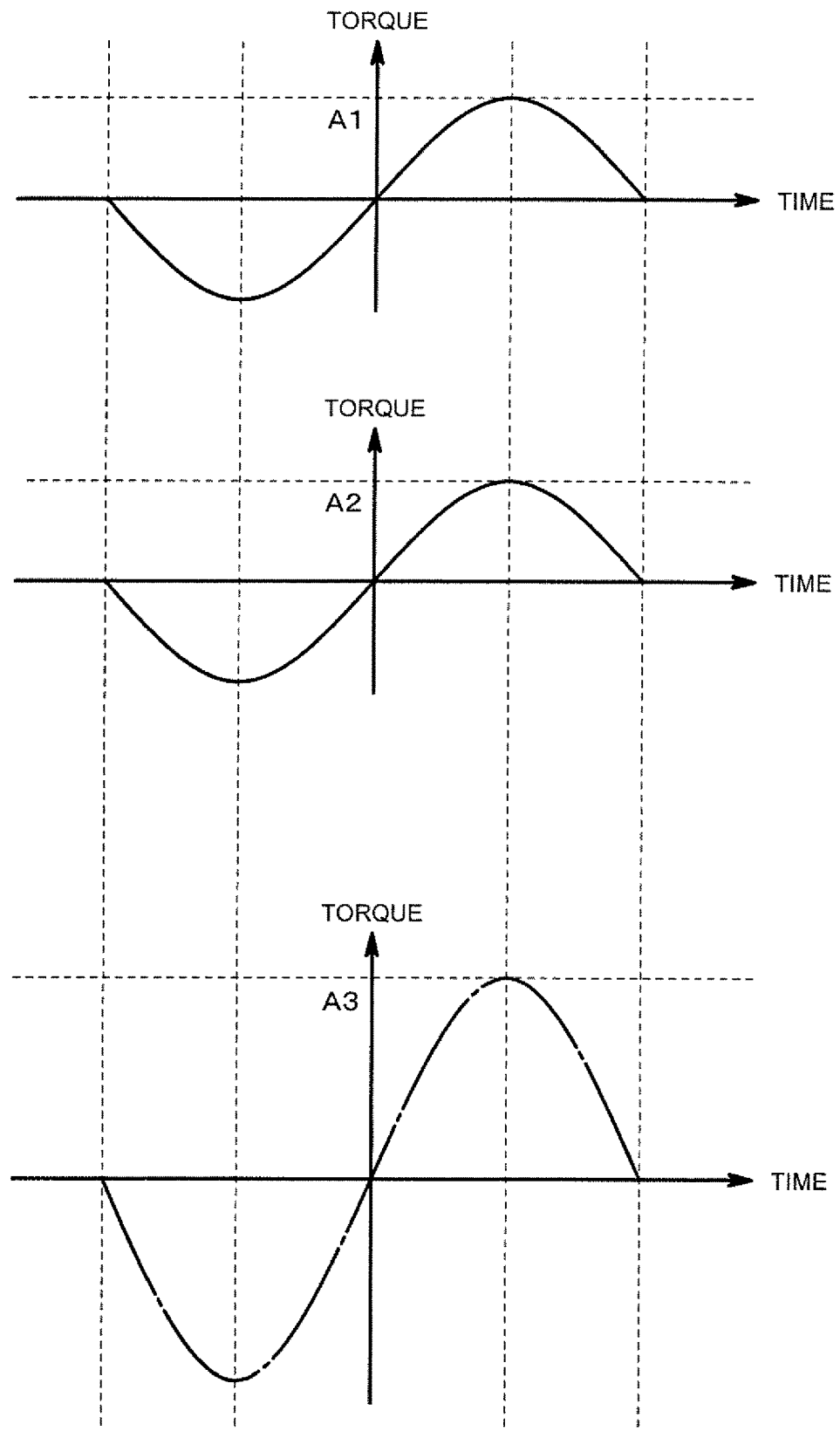
FIG. 25 is a diagram exemplifying torques (same phase) of a first torque generation mechanism and a second torque generation mechanism, and a change of a combined torque thereof.

An upper part of FIG. 25 shows a change of the torque (damping torque) applied to the shaft 1016 from the first torque generation mechanism 1030. A middle part of FIG. 25 shows a change of the torque (damping torque) applied to the shaft 1016 from the second torque generation mechanism 1030'. Here, it is assumed that, in the first torque generation mechanism 1030 and the second torque generation mechanism 1030', the relative angular position of the magnets 1024A~1024D and 1024A'~1024D' of the rotation units 1018 and 1018' is zero (same angle). Similarly, it is assumed that the relative angular position of the magnets 1028A~1028D and 1028A'~1028D' of the outer circumferential portions 1020 and 1020' is zero (same angle).

In this case, the changes of the torques applied to the shaft 1016 by the first and second torque generation mechanisms 1030 and 1030' are synchronous. A combined torque in which the torques are added (lower part of FIG. 25) has a same period as the torque waveforms of the first and second torque generation mechanisms 1030 and 1030', and an amplitude A3 of the combined torque is a sum of the amplitudes A1 and A2 of the torque waveforms of the first and second torque generation mechanisms 1030 and 1030' (A3=A1+A2).

Figure 26:
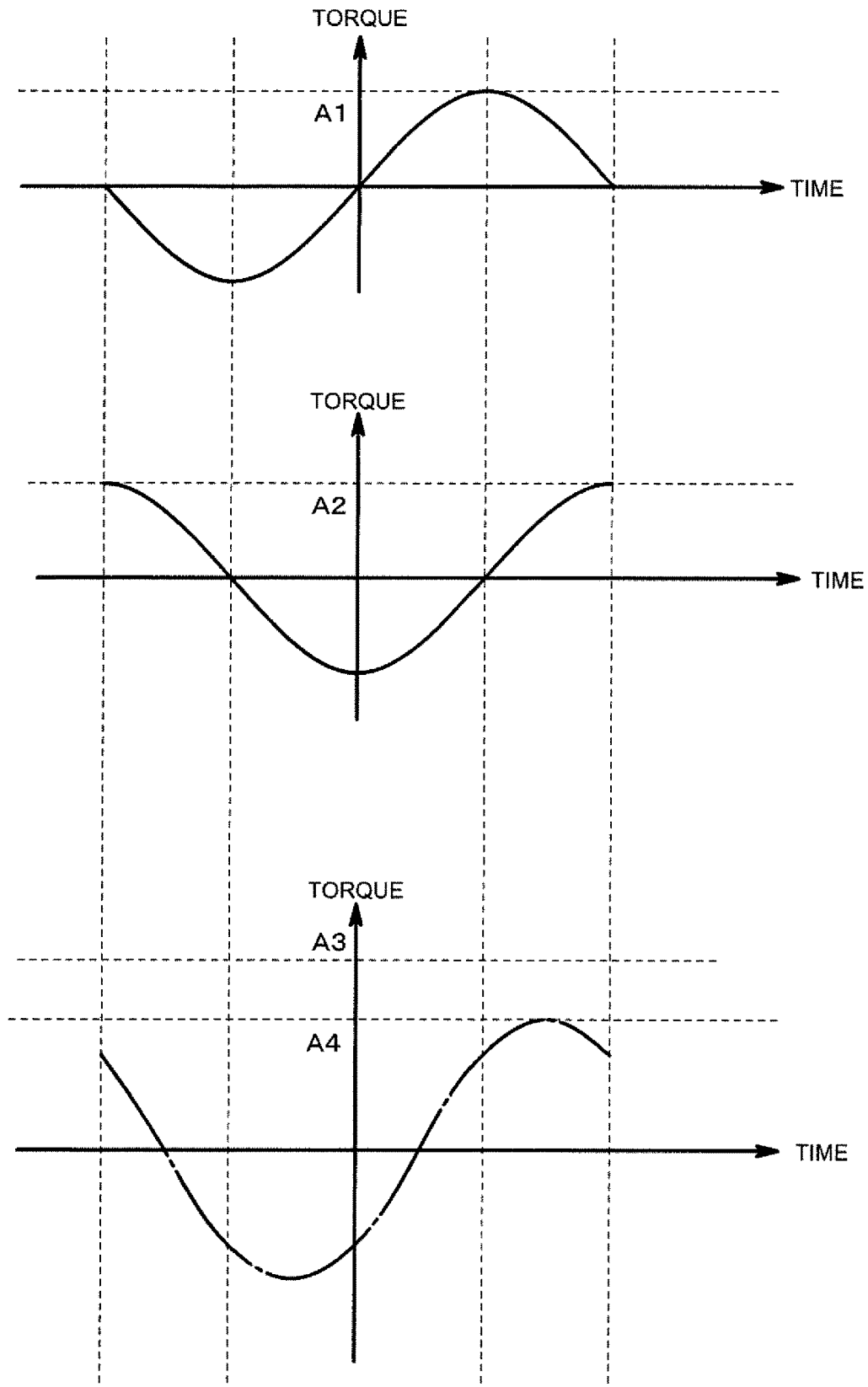
FIG. 26 is a diagram exemplifying torques (shifted phases) of the first and second torque generation mechanisms and a change of the combined torque thereof.
Figure 27:
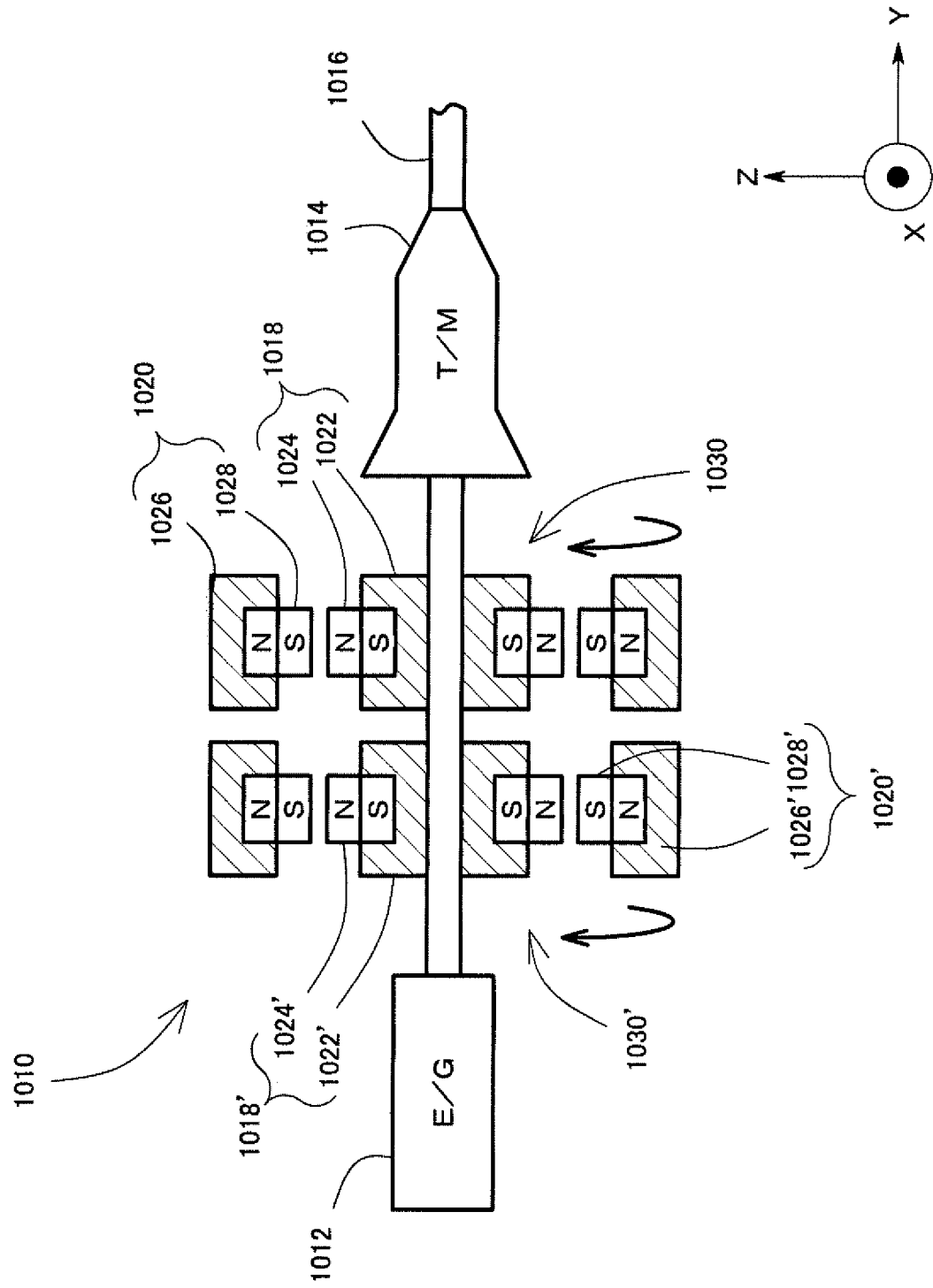
FIG. 27 is a diagram for explaining an overview of a torque variation suppressing apparatus according to a third embodiment of the present disclosure.
Figure 28:
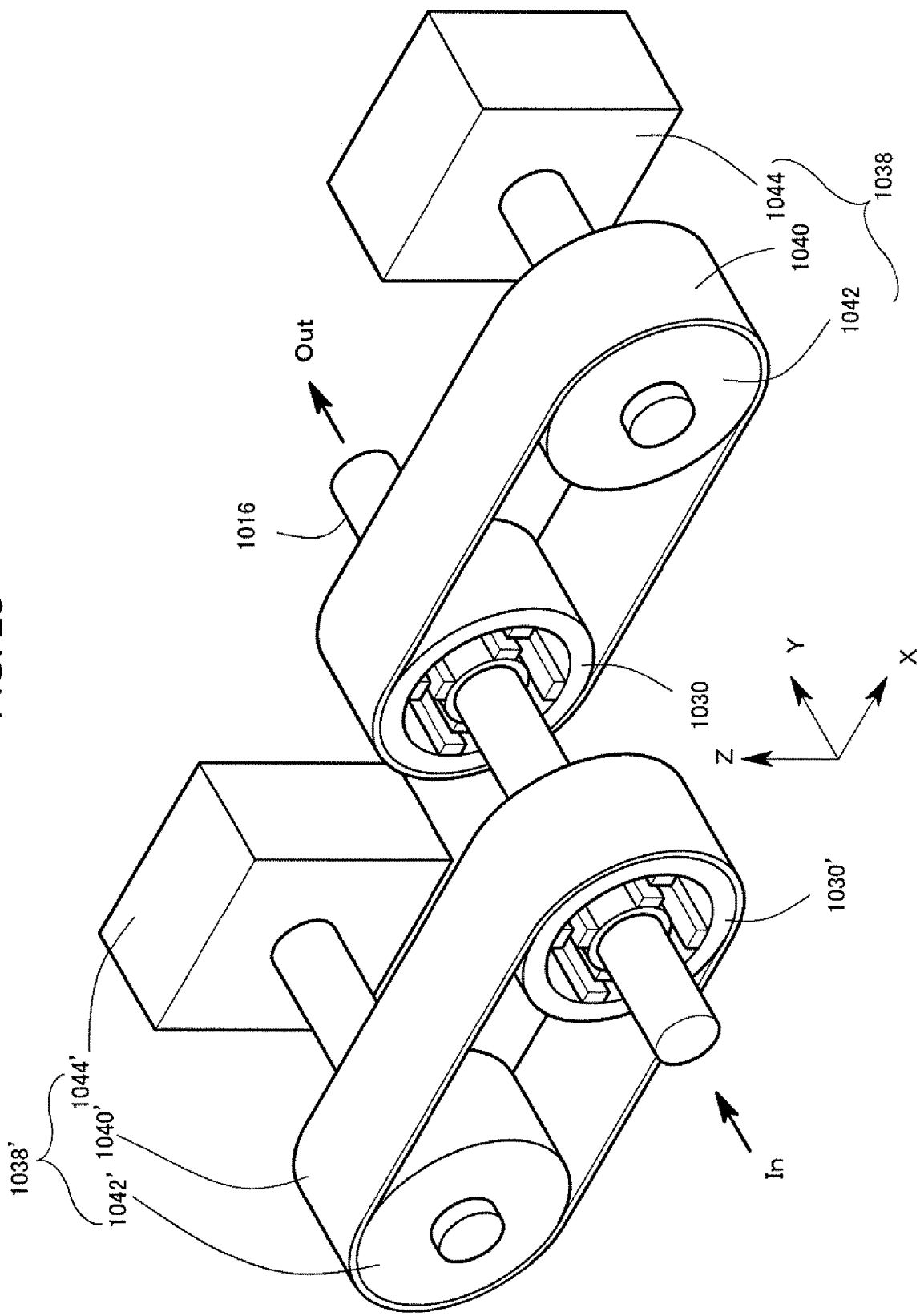
FIG. 28 is a perspective diagram exemplifying the torque variation suppressing apparatus according to the third embodiment of the present disclosure.

FIG. 26 shows an example when the relative angular position of the outer circumferential portion 1020' of the second torque generation mechanism 1030' is set in a 90° advanced phase side with respect to the outer circumferential portion 1020 of the first torque generation mechanism 1030. According to FIG. 26, the combined torque (lower part of FIG. 26) in which the torques are added has the same period as the torque waveforms of the first and second torque generation mechanisms 1030 and 1030', but the phase thereof is shifted from the torque waveforms of the torque generation mechanisms. The amplitude of the combined torque is an amplitude A4 which is smaller compared to the amplitude A3 of FIG. 25.

As described, in the torque variation suppressing apparatus 1010 of the second embodiment, a part of the apparatus is separated from the rotation system. As a result, the weight load to the rotation transmission system can be reduced. In addition, the amplitude and the phase of the torque variation suppressing apparatus 1010 can be actively set according to the torque variation of the internal combustion engine.

Third Embodiment of Torque Variation Suppressing Apparatus

In the second embodiment, in the first torque generation mechanism 1030, the casing 1026 is fixed to the fixation unit 1029. In the third embodiment, an angle adjustment mechanism is also provided on the casing 1026. For example, as exemplified in FIGS. 27 and 28, belt pulley mechanisms 1038 and 1038' are provided as angle adjustment mechanisms respectively in the first and second torque generation mechanisms 1030 and 1030'.

The belt pulley mechanisms 1038 and 1038' respectively comprise endless belts 1040 and 1040', rollers 1042 and 1042', and motors 1044 and 1044'. The rollers 1042 and 1042' are bridged over the outer circumferential surfaces of the outer circumferential portions 1020 and 1020'. With rotation of the motors 1044 and 1044', the endless belts 1040 and 1040' move, and, consequently, relative angles of the first and second torque generation mechanisms 1030 and 1030' can be independently changed.

An example operation of such a torque variation suppressing apparatus 1010 having the first torque generation mechanism 1030 and the second torque generation mechanism 1030' will now be described with reference to FIGS. 29 and 30. In all graphs, a horizontal axis represents time and a vertical axis represents torque. Similar to FIG. 21, the horizontal axis may alternatively represent the rotational phase of the shaft 1016.

Figure 29:
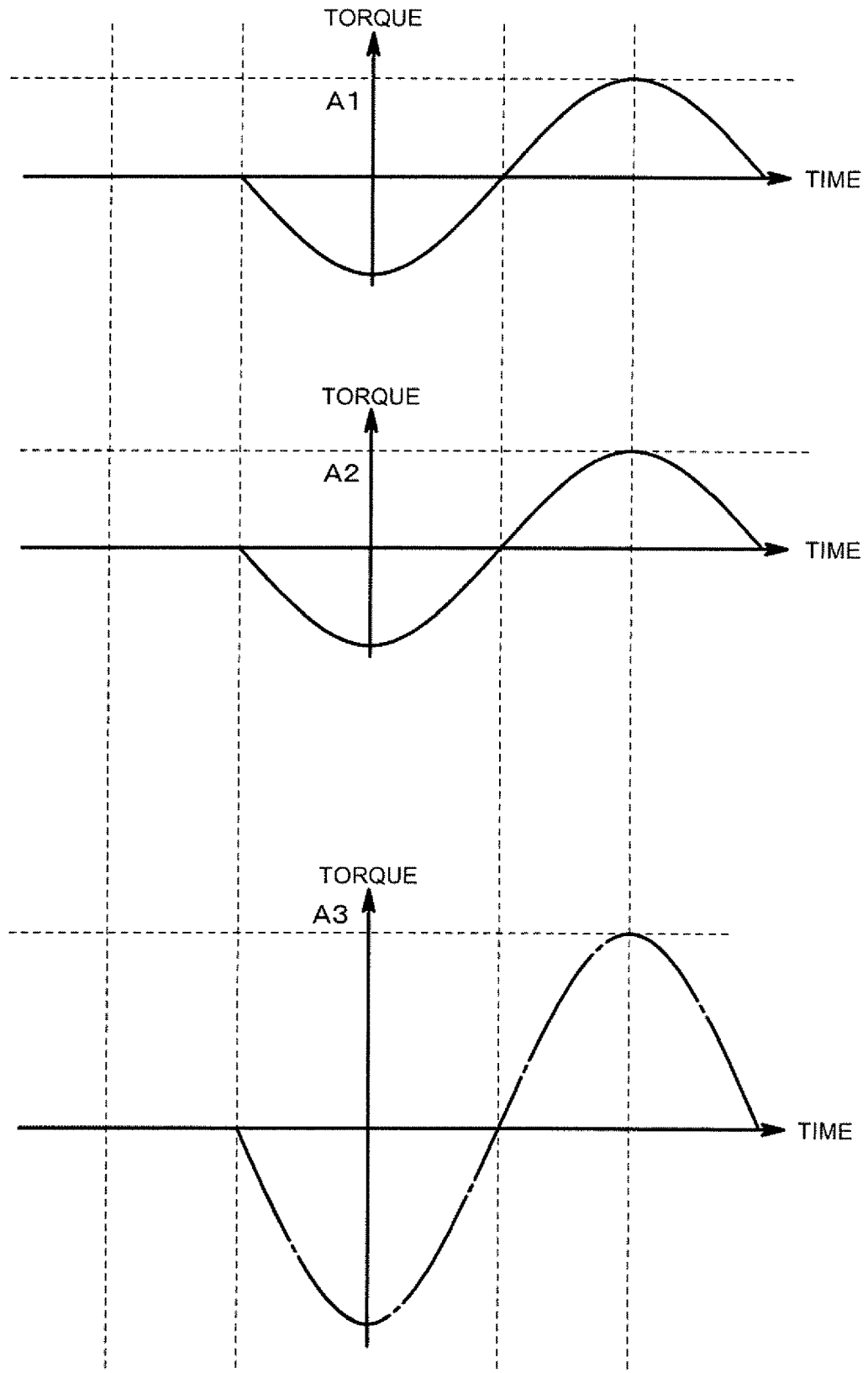
FIG. 29 is a diagram exemplifying torques (same phase) of a first torque generation mechanism and a second torque generation mechanism, and a change of a combined torque thereof.

An upper part of FIG. 29 shows a change of the torque applied to the shaft 1016 from the first torque generation mechanism 1030. A middle part of FIG. 29 shows a change of the torque applied to the shaft 1016 from the second torque generation mechanism 1030'. A lower part of FIG. 29 shows a combined torque in which the torques by these torque generation mechanisms are added.

Here, in the example configuration of FIG. 29, in comparison to the example configuration of FIG. 25, the magnets 1028A~1028D and 1028A'~1028D' of the outer circumferential portions 1020 and 1020' of the first and second torque generation mechanisms 1030 and 1030' are shifted in a side of 90° advance angle. It is assumed that the relative angular position of the magnets 1028A~1028D and 1028A'~1028D' is zero (same angle). In this case, the combined torque has an amplitude A3, and a phase thereof is shifted to the side of 90° advanced angle from the example configuration of FIG. 25.

Figure 30:
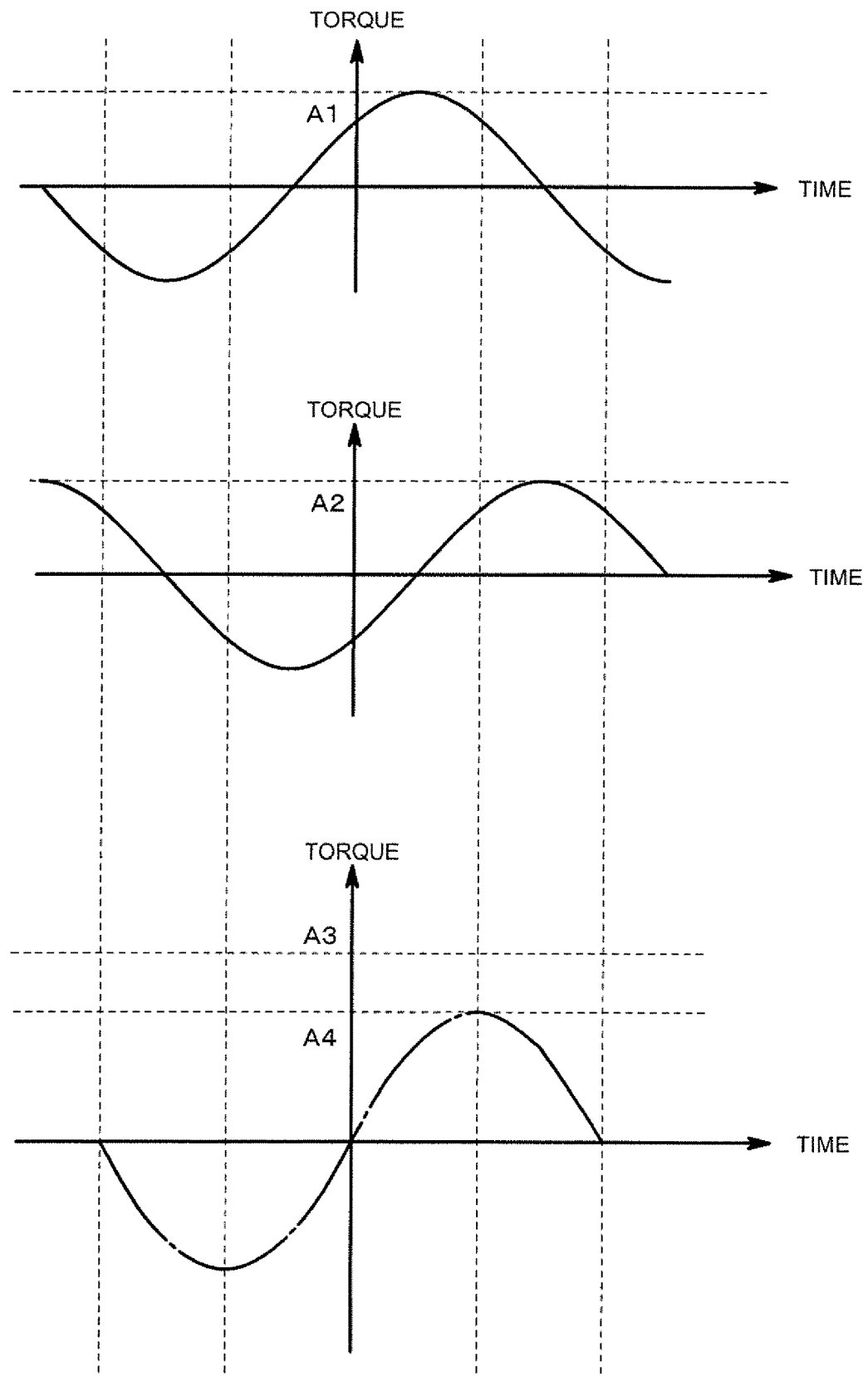
FIG. 30 is a diagram exemplifying the torques (shifted phases) of the first and second torque generation mechanisms, and a change of the combined torque thereof.

FIG. 30 shows an example configuration where the magnets 1028A~1028D of the first torque generation mechanism 1030 are shifted in the side of 45° advanced angle and the magnets 1028A'~1028D' of the second torque generation mechanism 1030' are shifted on the side of 45° delayed angle. In this case, the amplitude of the combined torque is A4 similar to FIG. 26, but the phase matches that of FIG. 25. In other words, the resulting combined torque is similar to the waveform of FIG. 25, with only the amplitude adjusted.

Figure 31:
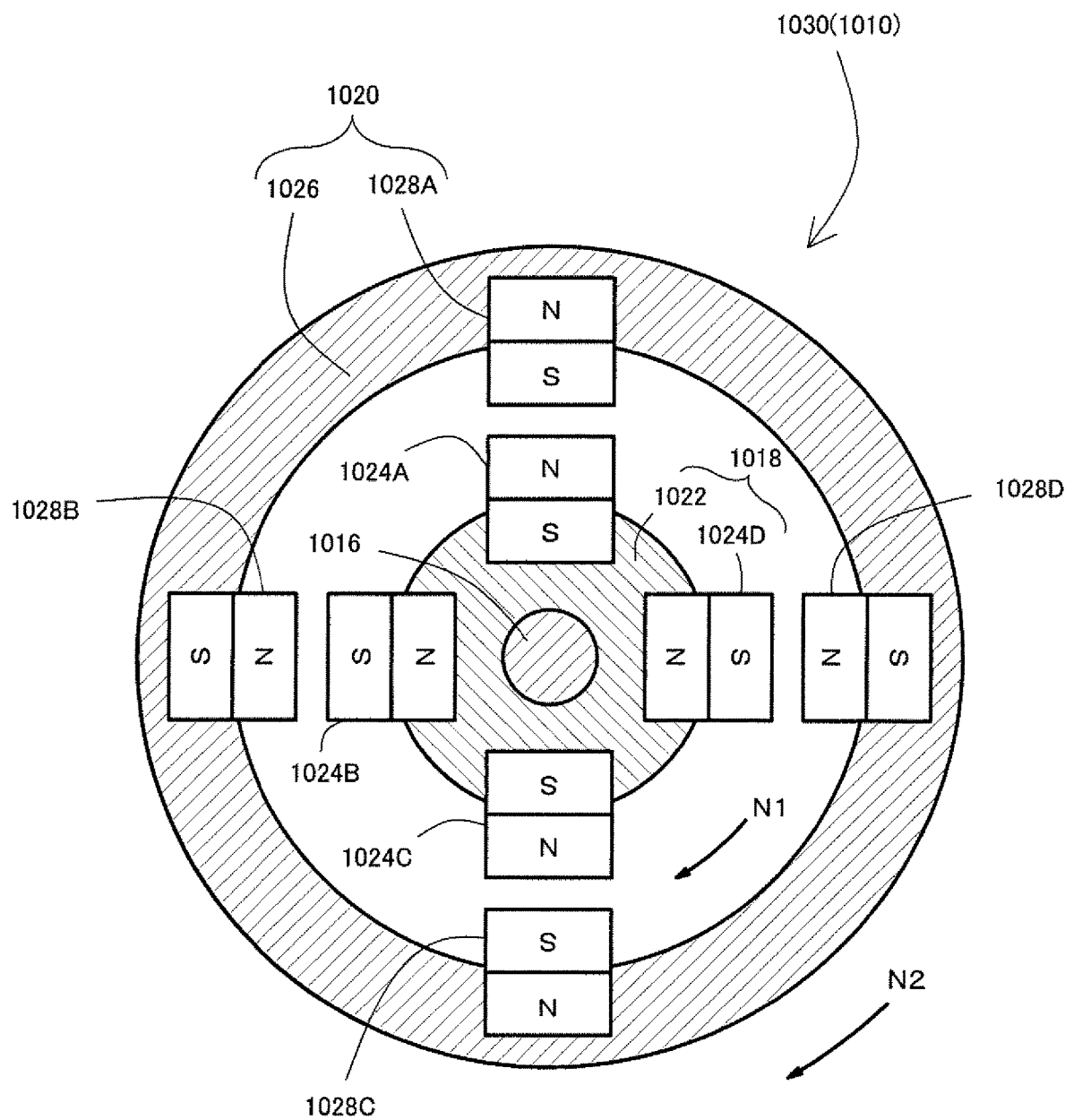
FIG. 31 is a diagram for explaining an overview of a torque variation suppressing apparatus according to a fourth embodiment of the present disclosure.

As described, in the torque variation suppressing apparatus 1010 of the third embodiment, a part of the apparatus is separated from the rotation system. As a result, the weight load to the rotation transmission system can be reduced. In addition, the amplitude and the phase of the torque variation suppressing apparatus 1010 can be actively set according to the torque variation of the internal combustion engine. Further, the amplitude can be changed while the phase and the period are fixed Fourth Embodiment of Torque Variation Suppressing Apparatus In a fourth embodiment, using the third embodiment shown in FIG. 28, the periods of the first torque generation mechanism 1030 and the second torque generation mechanism 1030' are set variable. FIG. 31 shows a plan view, viewed in the Y axis direction, of the first torque generation mechanism 1030. As the second torque generation mechanism 1030' operates in a similar manner, the description thereof is omitted in the following.

In the present embodiment, the belt pulley mechanism 1038 (not shown) is used not only as the angle adjustment mechanism for adjusting the phase difference of the first and second torque generation mechanism 1030 and 1030', but also as a rotation mechanism for rotating the first and second torque generation mechanisms 1030 and 1030'.

The outer circumferential portion 1020 is rotated by the belt pulley mechanism 1038. Using a number of rotations N1 per unit time of the shaft 1016 and a number of rotations N2 per unit time of the outer circumferential portion 1020, and a number of magnetic pole pairs p of the torque generation mechanism 1030 (in the example configuration of FIG. 31, p=2), a frequency f of the torque variation suppressing apparatus 1010 with respect to the shaft 1016 can be represented as the following Equation (2).

$$f=|p(N_1-N_2)| \tag{2}$$

As can be understood from Equation (2), for example, when the outer circumferential portion 1020 is rotated in the same rotational direction as the shaft 1016, reaching of the shaft 1016 to the origin of the outer circumferential portion 1020 is delayed, and, consequently, the frequency is reduced and the period is increased.

In addition, with the belt pulley mechanisms 1038 and 1038', the relative angle of the first torque generation mechanism 1030 and the second torque generation mechanism 1030' is adjusted, to set the amplitude and the phase of the damping torque. Further, while maintaining the phase difference, the first torque generation mechanism 1030 and the second torque generation mechanism 1030' are rotated at equal speed by the belt pulley mechanisms 1038 and 1038'. With such a configuration, the period of the damping torque can be adjusted.

As described, in the present embodiment, a part of the torque variation suppressing apparatus is separated from the rotation system. As a result, the weight load to the rotation transmission system can be reduced. In addition, the amplitude and the phase of the torque variation suppressing apparatus 1010 can be actively set according to the torque variation of the internal combustion engine 1012. Further, the amplitude can be changed while the phase and the period are fixed. In addition, a torque variation period with respect to the shaft 1016 can also be changed.

Fifth Embodiment of Torque Variation Suppressing Apparatus

In the first through fourth embodiments, the torque variation suppressing apparatus 1010 is formed using magnets. Alternatively, the torque variation suppressing apparatus 1010 may be formed using other members, for example, a cam mechanism as shown in FIG. 32.

Figure 32:
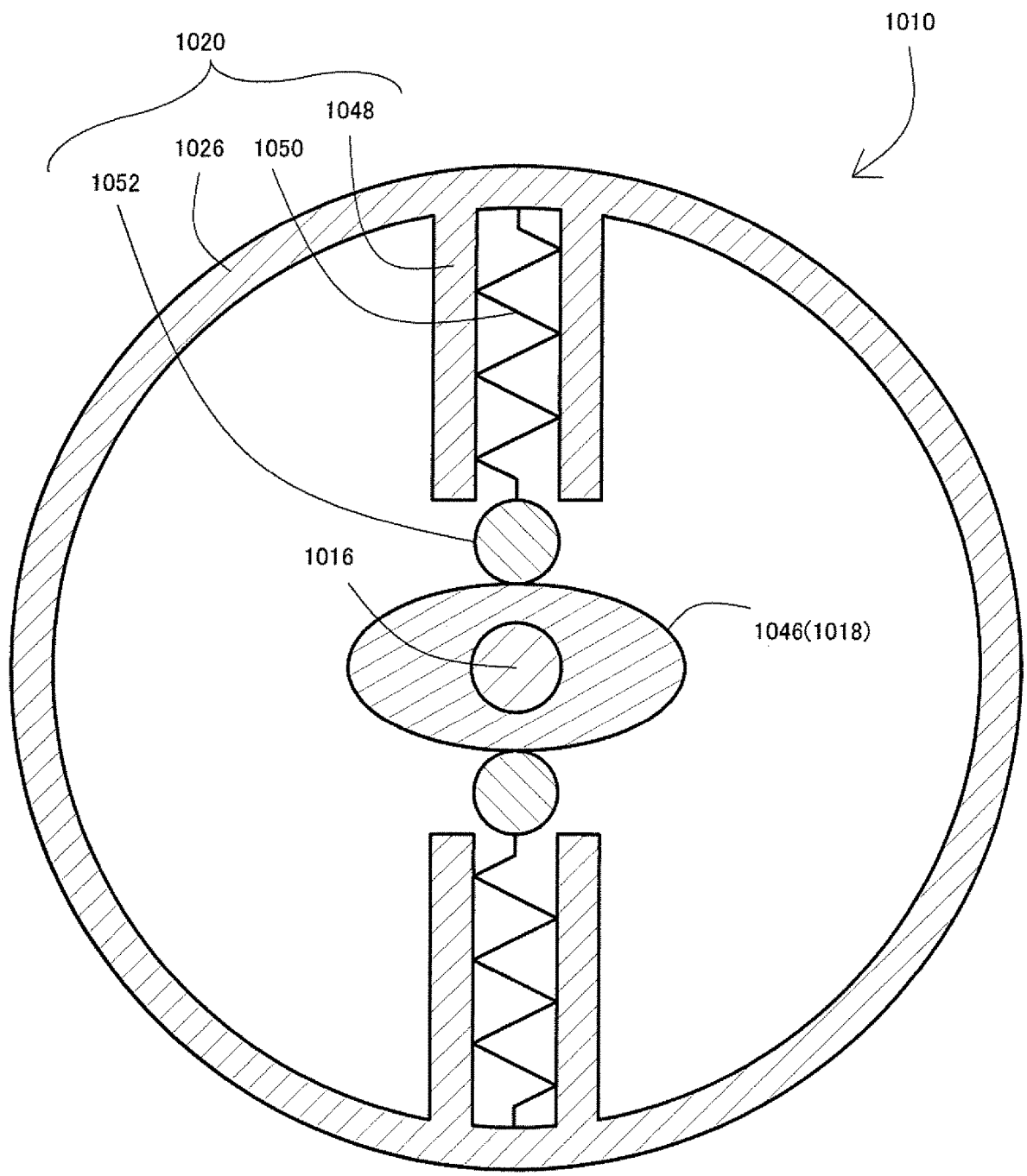
FIG. 32 is a diagram for explaining an overview of a torque variation suppressing apparatus according to a fifth embodiment of the present disclosure.

In the example configuration of FIG. 32, the rotation unit 1018 comprises a cam 1046 provided on the shaft 1016 and which rotates with the shaft 1016. The cam 1046 is formed so that a diameter thereof changes around the circumference. For example, the cam 1046 may be a flat plate having an elliptical shape or a perfect ellipse shape.

The outer circumferential portion 1020 is separated (in no mechanical connection relation) from the rotation transmission system including the shaft 1016 and the rotation unit 1018. The outer circumferential portion 1020 comprises the casing 1026, a guide 1048, an elastic element 1050, and a hearing 1052. The casing 1026 is provided concentrically with the shaft 1016, and is separated in the radial direction from the shaft 1016, and is formed in, for example, a circular tubular shape. The guide 1048 extends from an inner circumference of the casing 1026 toward the shaft 1016. The guide 1048 stores therein the elastic element 1050.

The elastic element 1050 has one end connected to an inner circumferential surface of the casing 1026, and the other end connected to the hearing 1052. The elastic element 1050 is formed from an elastic material such as a coil spring and a rubber. The bearing 1052 contacts an outer circumferential surface of the cam 1046 in a manner to allow rotation. The bearing 1052 is urged toward an inner side in the radial direction by the elastic element 1050.

Figure 33:
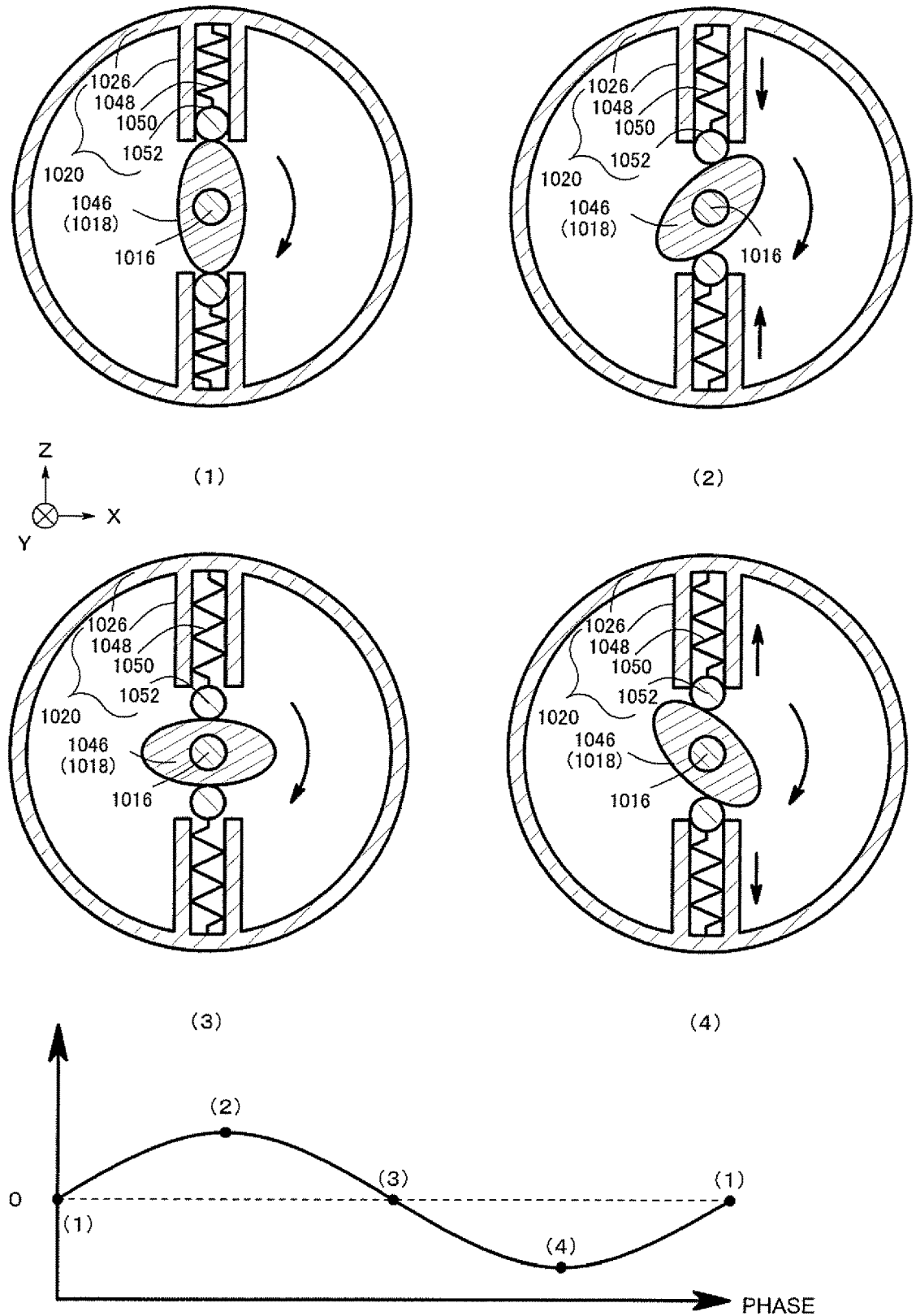
FIG. 33 is a diagram for explaining a behavior of the torque variation suppressing apparatus according to the fifth embodiment of the present disclosure.
Figure 34:
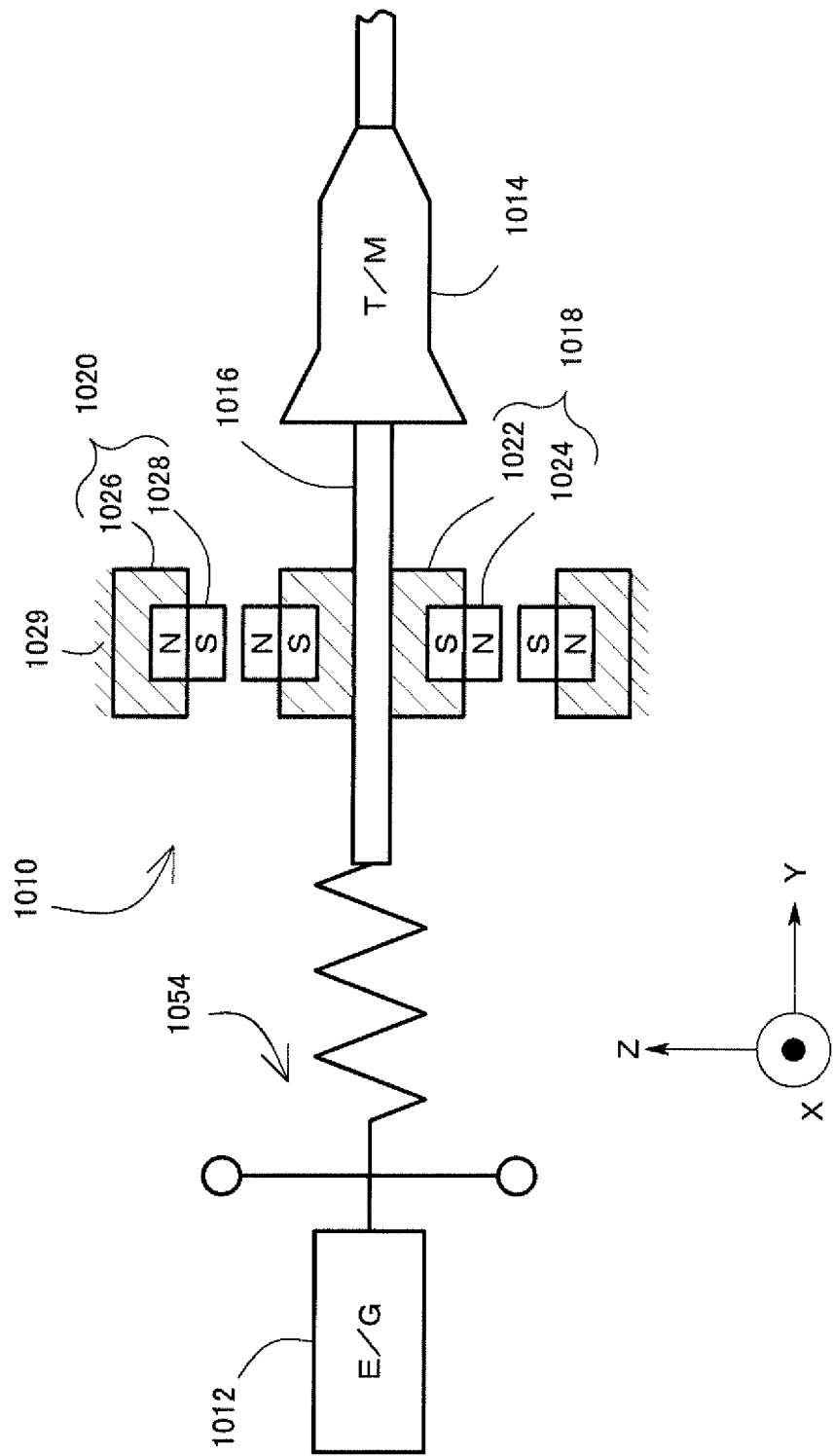
FIG. 34 is a diagram showing an alternative configuration of the torque variation suppressing apparatuses according to the first through the fifth embodiments of the present disclosure.

FIG. 33 shows an example operation of the torque variation suppressing apparatus 1010 according to the fifth embodiment. From (1) through (2) to (3) of FIG. 33, the cam 1046 is rotated with the rotation of the shaft 1016. In this process, a distance from the center of the shaft 1016 to the outer circumferential surface of the cam 1046 becomes shorter as the angle progresses, and is along the expansion of the elastic element 1050. In this case, an urging force is applied in the same direction as the rotation of the shaft 1016 to the shaft 1016 from the elastic element 1050.

After the distance from the center of the shaft 1016 to the outer circumferential surface of the cam 1046 becomes the minimum in (3) of FIG. 33, during (4) and until (1), the shaft 1016 and the cam 1046 rotate in a direction resisting the urging force of the elastic element 1050; that is, in a direction to compress the elastic element 1050. In this process, an urging force in an opposite direction from the rotation of the shaft 1016 is applied to the shaft 1016 from the elastic element 1050.

In this manner, the force in the same direction as the rotation of the shaft 1016 and the force in the opposite direction from the rotation are applied in a switching manner to the shaft 1016 according to the relative rotational position of the rotation unit 1018 (cam 1046) and the outer circumferential portion 1020 (elastic element 1050). In other words, the torque applied to the shaft 1016 from the torque variation suppressing apparatus 1010 in FIG. 33 is similar to that shown in FIG. 21.

As described, in the present embodiment, in having the torque suppressing mechanism as described above, a part of the torque variation suppressing apparatus 1010 is separated from the rotation transmission system. As a result, the weight load to the rotation transmission system can be reduced.

In the first through fifth embodiments described above, the shaft 1016 is directly connected from the internal combustion engine 1012 and the torque variation suppressing apparatus 1010 is connected to the shaft 1016. Alternatively, as exemplified in FIG. 34, the internal combustion engine 1012 and the shaft 1016 may be connected with each other via other damping devices such as a damper 1054. According to such a configuration, the torque which is input to the torque variation suppressing apparatus 1010 from the shaft 1016 can be set small, and the size of the torque variation suppressing apparatus 1010 can be reduced.

The present disclosure is not limited to the embodiments described above, and includes all modifications and changes within the scope and spirit of the present disclosure as defined in the claims.

The invention claimed is:

1. A torque control mechanism comprising:
   a rotation element comprising a crank shaft; and
   a plurality of elastic elements whose one ends are connected to the crank shaft, wherein elastic forces of the plurality of elastic elements are changed through compression in response to rotation of the rotation element, thereby causing the plurality of elastic elements to apply a periodically varying torque to the rotation element;
   a plurality of elastic element retainers connected to the other ends of the plurality of elastic elements; and
   a retainer comprising a rotation mechanism capable of rotating the plurality of elastic element retainers about a rotation axis of the rotation element relative to each other, wherein:

relative angles of the plurality of elastic element retainers are changed by the rotation mechanism, to thereby change a phase of a torque applied to the rotation element from at least one of the elastic elements so that a combined torque applied to the rotation element from the plurality of elastic elements is variably set.

2. The torque control mechanism according to claim 1, wherein the relative angles of the plurality of elastic element retainers are changed by the rotation mechanism, to thereby change the phase of the torque applied to the rotation element from at least one of the plurality of elastic elements so that torques applied to the rotation element from the plurality of elastic structures are cancelled, and the combined torque applied to the rotation element can be set to zero.

3. A damper apparatus comprising:

the torque control mechanism according to claim 1, wherein when a damping characteristic with respect to the rotation element is to be increased, an overall torque applied to the rotation element is reduced, and when a torque which is output from the rotation element is to be increased, an overall torque applied to the rotation element is increased.

* * * * *